(12) United States Patent
Yousefpor et al.

(10) Patent No.: US 9,310,931 B2
(45) Date of Patent: Apr. 12, 2016

(54) DYNAMIC CROSS-TALK MITIGATION FOR INTEGRATED TOUCH SCREENS

(71) Applicant: Apple Inc., Cupertino, CA (US)

(72) Inventors: Marduke Yousefpor, San Jose, CA (US); Christoph Horst Krah, Los Altos, CA (US); Kevin J. White, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/844,171

(22) Filed: Mar. 15, 2013

(65) Prior Publication Data

US 2014/0267086 A1    Sep. 18, 2014

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC .............................. G06F 3/0418; G06F 3/044
USPC ................. 345/76, 78, 82–83, 214, 208, 211; 315/169.3
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2004/0113872 A1* | 6/2004 | Nanno et al. ..................... | 345/76 |
| 2006/0026521 A1 | 2/2006 | Hotelling et al. | |
| 2006/0197753 A1 | 9/2006 | Hotelling | |
| 2009/0167326 A1* | 7/2009 | Geaghan ....................... | 324/678 |
| 2011/0128254 A1* | 6/2011 | Teranishi et al. ............. | 345/174 |
| 2011/0267283 A1* | 11/2011 | Chang et al. .................. | 345/173 |

FOREIGN PATENT DOCUMENTS

| | | | |
|---|---|---|---|
| JP | 2000-163031 A | 6/2000 | |
| JP | 2002-342033 A | 11/2002 | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(Continued)

*Primary Examiner* — Shaheda Abdin
(74) *Attorney, Agent, or Firm* — Morrison & Foerster LLP

(57) ABSTRACT

A touch input device configured to mitigate the effects of dynamic cross talk noise is provided. The touch input device can dither an effective resistance of a plurality of gate lines proximal to the touch sensor panel in order to determine if a phase of a touch signal demodulator needs to be adjusted.

25 Claims, 16 Drawing Sheets

(56) References Cited

OTHER PUBLICATIONS

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

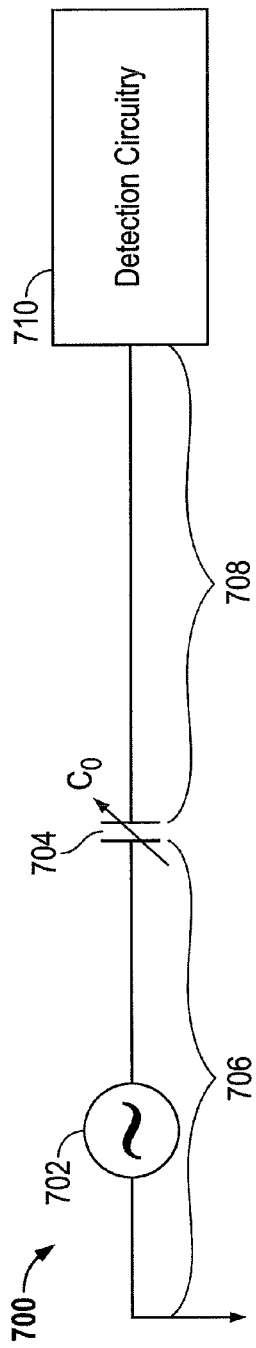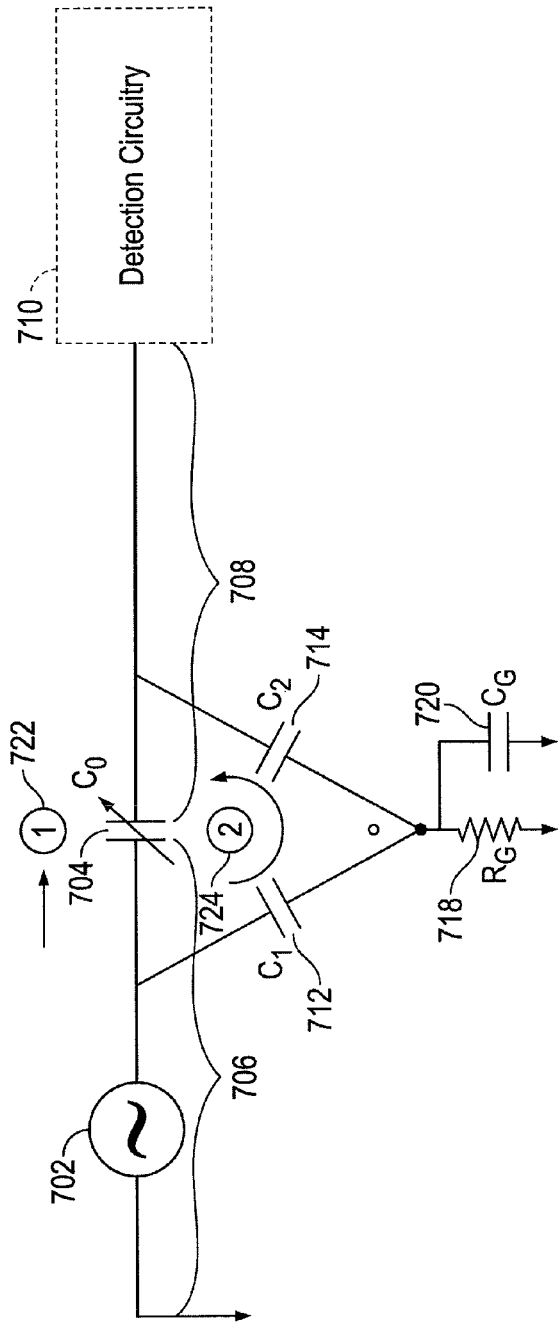

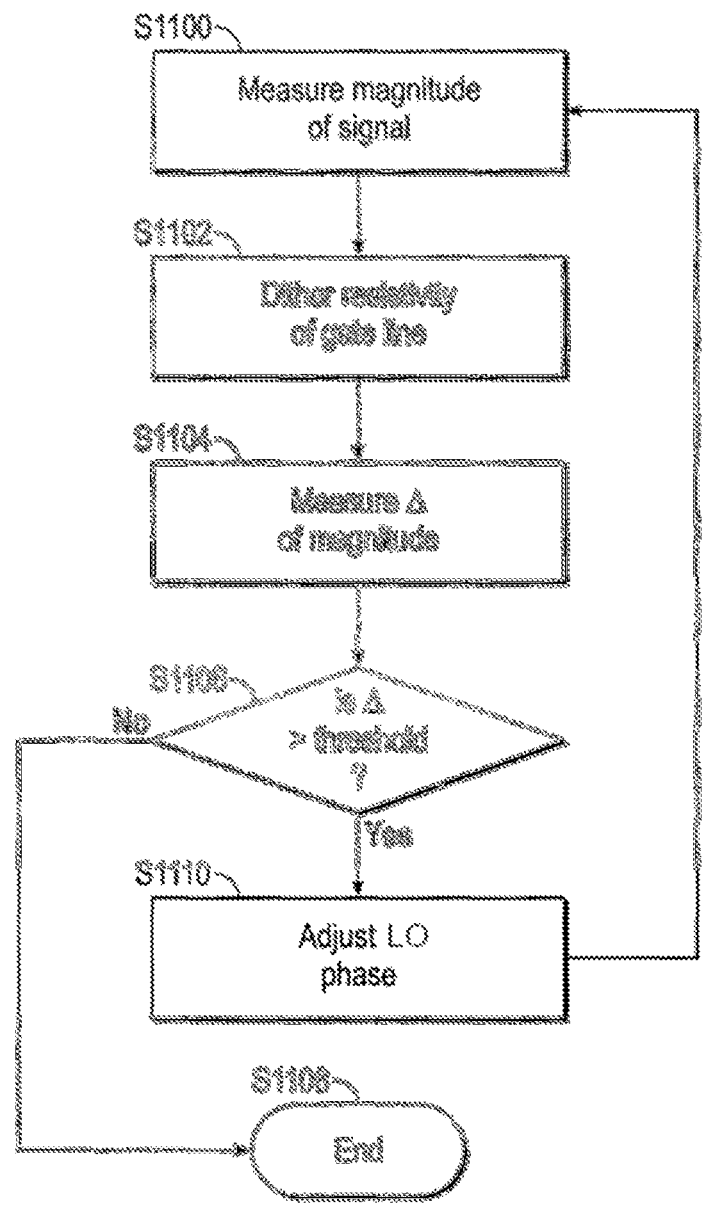
FIG. 11
AMENDED

DYNAMIC CROSS-TALK MITIGATION FOR INTEGRATED TOUCH SCREENS

FIELD OF THE DISCLOSURE

This relates generally to touch sensing, and more particularly, to dynamic cross-talk mitigation for integrated display touch screens.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display node stackup (i.e., the stacked material layers forming the display nodes). This integration of the touch hardware and display hardware can lead to parasitic capacitances or "cross-talk" which act as noise and can interfere with normal touch detection.

SUMMARY

The following description includes examples of reducing or eliminating the effects of noise that can be generated by proximal electronics of a touch screen device, such as a gate line voltage system that applies voltage to gate lines of the touch screen. In one example, a touch signal demodulator local oscillator can have its phase tuned such that the phase is orthogonal to the phase of a noise signal created by parasitic signal paths. During operation of the device, various circuit parameters can be modulated and the resulting touch signal analyzed, to ensure that the demodulator phase remains orthogonal to the noise signal. If it is found that the demodulator is not tuned to be orthogonal to the noise signal, then the demodulator phase can be adjusted to ensure orthogonality with the noise signal.

BRIEF DESCRIPTION OF THE DRAWINGS

FIG. 7a illustrates an example touch sensing circuit according to examples of the disclosure.

FIG. 7b illustrates an example touch sensing circuit with parasitic capacitance pathways according to examples of the disclosure.

FIG. 11 illustrates an example method of dynamically adjusting a local oscillator phase according to examples of the disclosure.

DETAILED DESCRIPTION

In the following description of examples, reference is made to the accompanying drawings which form a part hereof, and in which it is shown by way of illustration specific examples of the disclosure that can be practiced. It is to be understood that other examples can be used and structural changes can be made without departing from the scope of the examples of this disclosure.

The following description relates to the dynamic mitigation of noise cause by parasitic capacitances which can act as a noise source to touch detection. A demodulator of the touch detection circuitry can be tuned to be orthogonal to the phase of a noise signal, thereby cancelling or substantially reducing the effect of the noise signal on signal to noise ratio. Periodically throughout operation of the device, the touch detection system can monitor whether or not the demodulator is still tuned to be orthogonal to the noise, and if it is determined that it is not, can adjust the demodulator so that the phase remains orthogonal to the noise.

As touch sensing circuitry becomes more closely integrated with circuitry of other systems, undesirable interaction between circuit elements of different systems can be more likely to occur. For example, touch sensing circuitry can be integrated into the display node stackups of integrated touch screens. Display node stackups are typically manufactured by processes including depositing, masking, etching, doping, etc., of materials such as conductive materials (e.g., metal, substantially transparent conductors), semiconductive materials (e.g., polycrystalline silicon (Poly-Si)), and dielectric materials (e.g., SiO2, organic materials, SiNx). Various elements formed within a display node stackup can operate as circuitry of the display system to generate an image on the display, while other elements can operate as circuitry of a touch sensing system that senses one or more touches on or near the display.

Figure 1C:
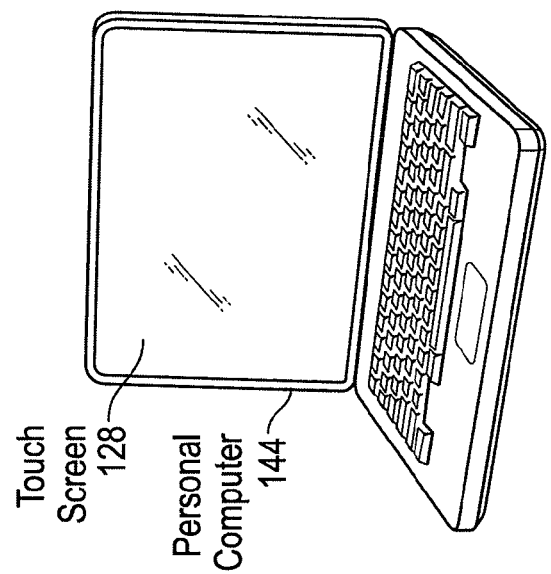
FIGS. 1A-1C illustrate an example mobile telephone, an example media player, and an example personal computer that each include an example touch screen according to examples of the disclosure.
Figure 1B:
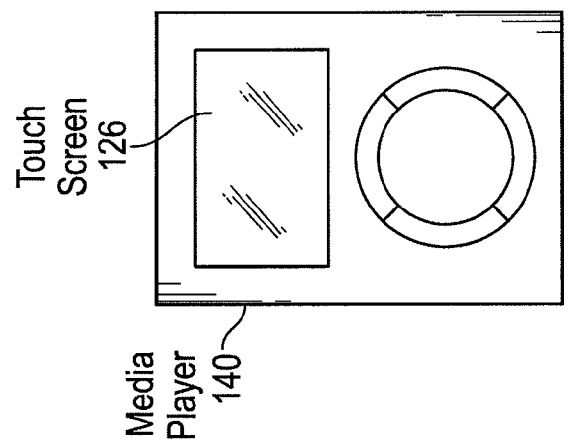
Figure 1A:
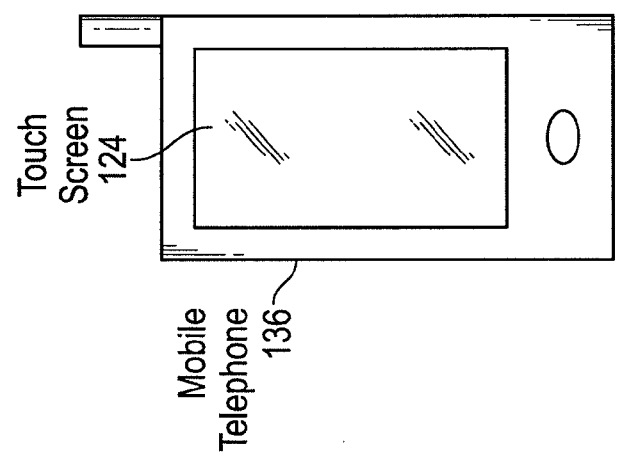

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Although not shown in the figures, the personal computer 144 can also be a tablet computer or a desktop computer with a touch-sensitive display. Touch screens 124, 126, and 128 may be based on, for example, self capacitance or mutual capacitance, or another touch sensing technology. A mutual capacitance based touch system can include, for example, drive regions and sense regions, such as drive lines and sense lines. For example, drive lines can be formed in rows while sense lines can be formed in columns. Touch nodes can be formed at the intersections of the rows and columns. During operation, the rows can be stimulated with an AC waveform and a mutual capacitance can be formed between the row and the column of the touch node. As an object approaches the touch node, some of the charge being coupled between the row and column of the touch node can instead be coupled onto the object. This reduction in charge coupling across the touch node can result in a net decrease in the mutual capacitance between the row and the column and a reduction in the AC waveform being coupled across the touch node. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
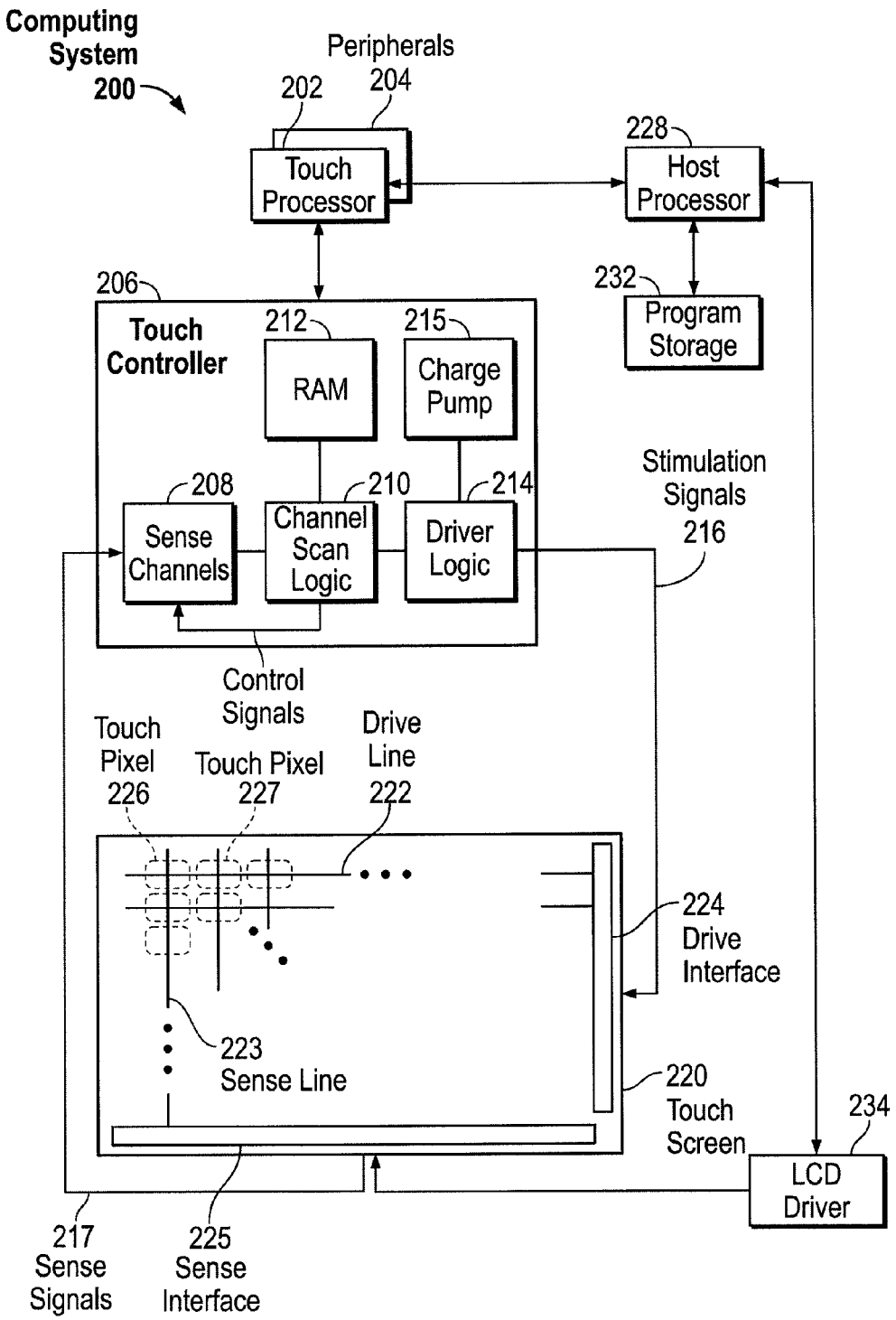
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is a sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch nodes), such as touch nodes 226 and 227. This way of understanding can be particularly useful when touch screen 220 is viewed as capturing an "image" of touch. In other words, after touch controller 206 has determined whether a touch has been detected at each touch node in the touch screen, the pattern of touch nodes in the touch screen at which a touch occurred can be thought of as an "image" of touch (e.g. a pattern of fingers touching the touch screen).

Figure 3:
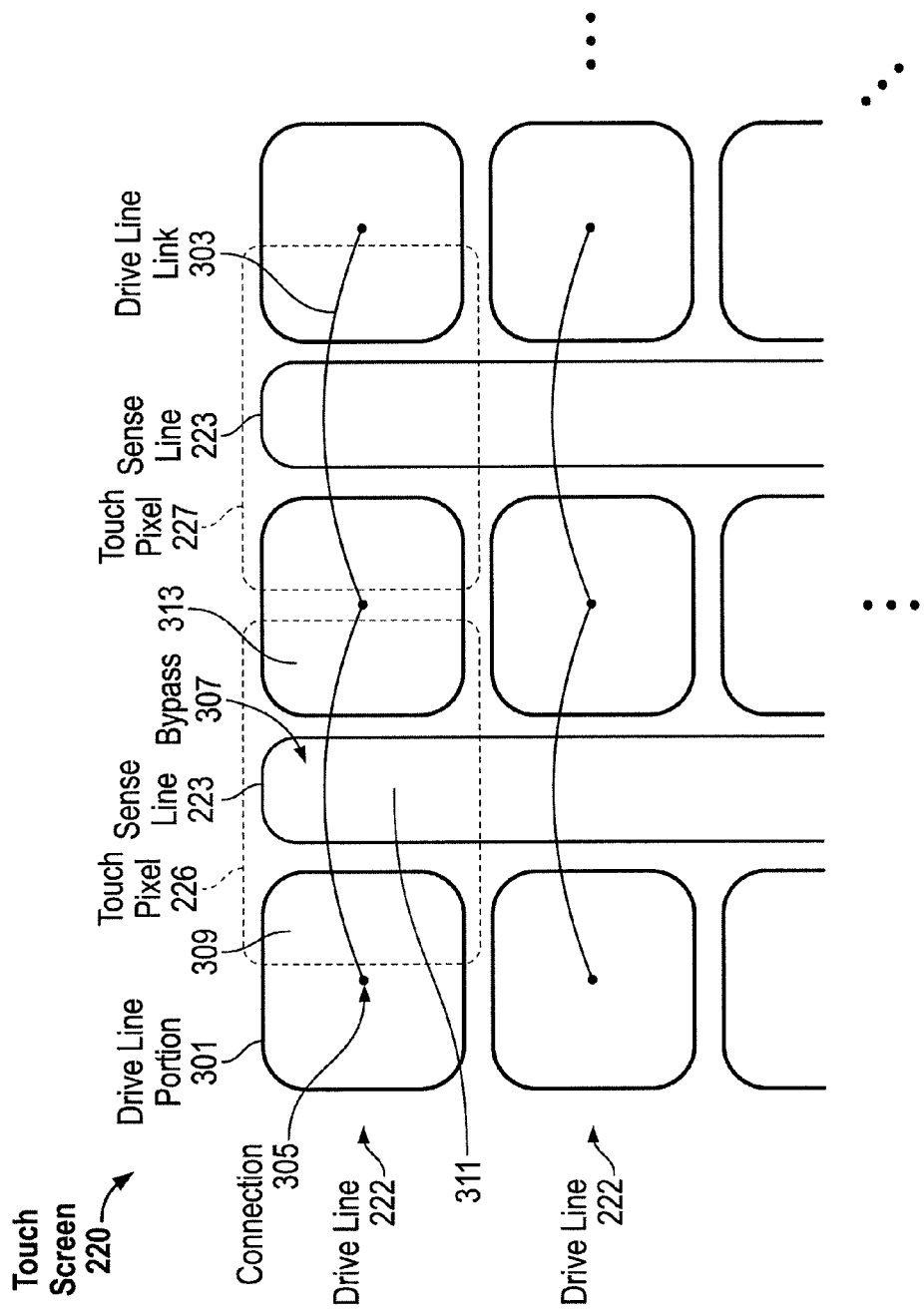
FIG. 3 is a more detailed view of the touch screen of FIG. 2 showing an example configuration of drive lines and sense lines according to examples of the disclosure.

In some example examples, touch screen 220 can be an integrated touch screen in which touch sensing circuit elements of the touch sensing system can be integrated into the display node stackups of a display. An example integrated touch screen in which examples of the disclosure can be implemented with now be described with reference to FIGS. 3-6. FIG. 3 is a more detailed view of touch screen 220 showing an example configuration of drive lines 222 and sense lines 223 according to examples of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch nodes such as touch nodes 226 and 227. Drive lines 222 (i.e., drive line segments 301 and corresponding drive line links 303) and sense lines 223 can be formed of electrical circuit elements in touch screen 220. In the example configuration of FIG. 3, each of touch nodes 226 and 227 can include a portion of one drive line segment 301, a portion of a sense line 223, and a portion of another drive line segment 301. For example, touch node 226 can include a right-half portion 309 of a drive line segment on one side of a portion 311 of a sense line, and a left-half portion 313 of a drive line segment on the opposite side of portion 311 of the sense line.

Figure 4:
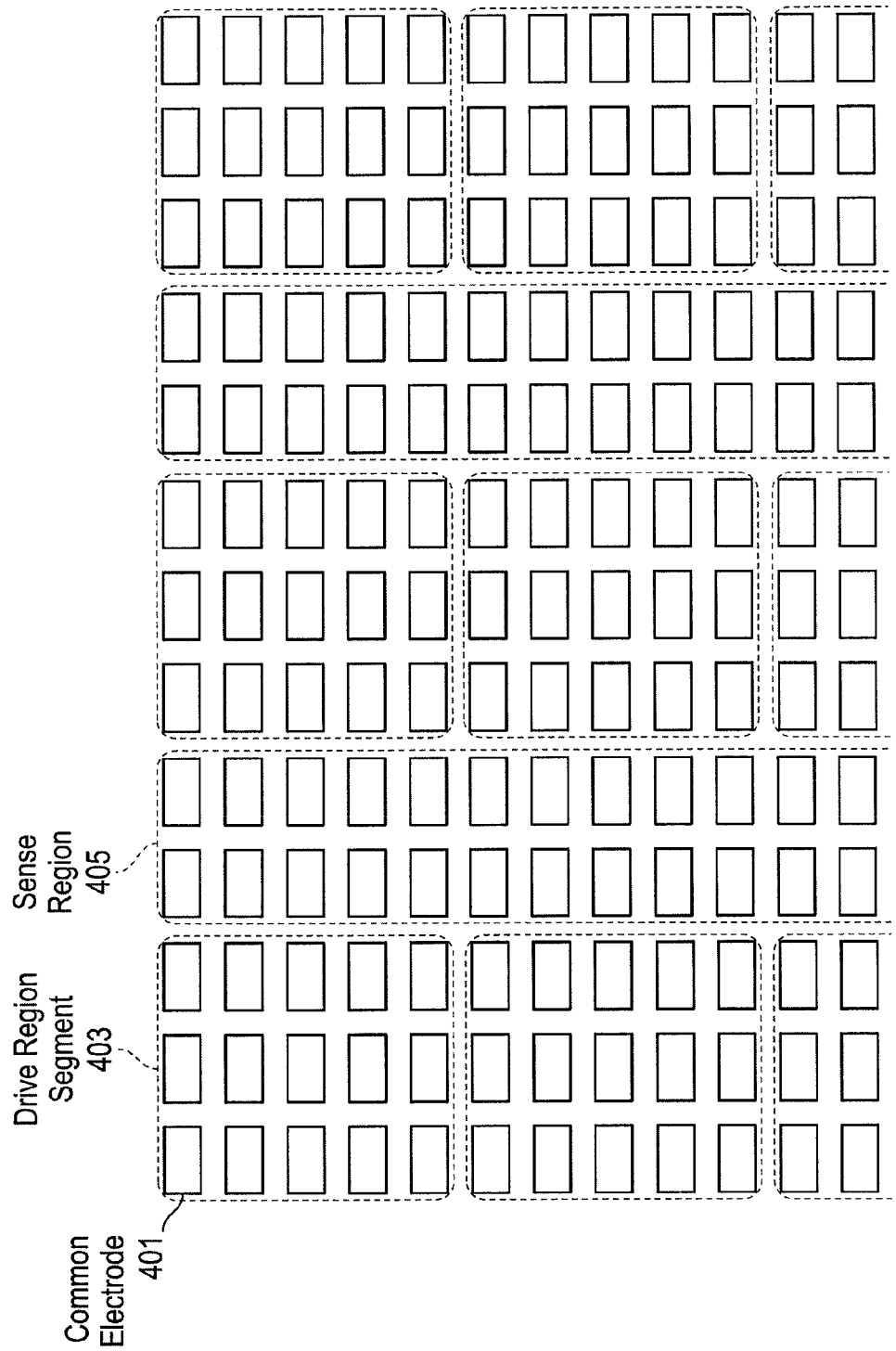
FIG. 4 illustrates an example configuration in which touch sensing circuitry includes common electrodes (Vcom) according to examples of the disclosure.

The circuit elements can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display node includes a common electrode 401, which is a circuit element of the display system circuitry in the node stackup (i.e., the stacked material layers forming the display nodes) of the display nodes of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display node stackups can be multi-function circuit elements and other circuit elements may be single-function circuit elements. In other examples, all of the circuit elements of the display node stackups may be single-function circuit elements.

In addition, although example examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although example examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display nodes into a region can mean operating the multi-function circuit elements of the display nodes together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display nodes of the touch screen can operate in both the display phase and the touch phase. For example, during a touch phase, common electrodes 401 can be grouped together to form touch signal lines, such as drive regions and sense regions. In some examples circuit elements can be grouped to form a continuous touch signal line of one type and a segmented touch signal line of another type. For example, FIG. 4 shows one example in which drive region segments 403 and sense regions 405 correspond to drive line segments 301 and sense lines 223 of touch screen 220. Other configurations are possible in other examples; for example, common electrodes 401 could be grouped together such that drive lines are each formed of a continuous drive region and sense lines are each formed of a plurality of sense region segments linked together through connections that bypass a drive region.

The drive regions in the example of FIG. 3 are shown in FIG. 4 as rectangular regions including a plurality of common electrodes of display nodes, and the sense regions of FIG. 3 are shown in FIG. 4 as rectangular regions including a plurality of common electrodes of display nodes extending the vertical length of the LCD. In some examples, a touch node of the configuration of FIG. 4 can include, for example, a 64×64 area of display nodes. However, the drive and sense regions are not limited to the shapes, orientations, and positions shown, but can include any suitable configurations according to examples of the disclosure. It is to be understood that the display nodes used to form the touch nodes are not limited to those described above, but can be any suitable size or shape to permit touch capabilities according to examples of the disclosure.

Figure 5:
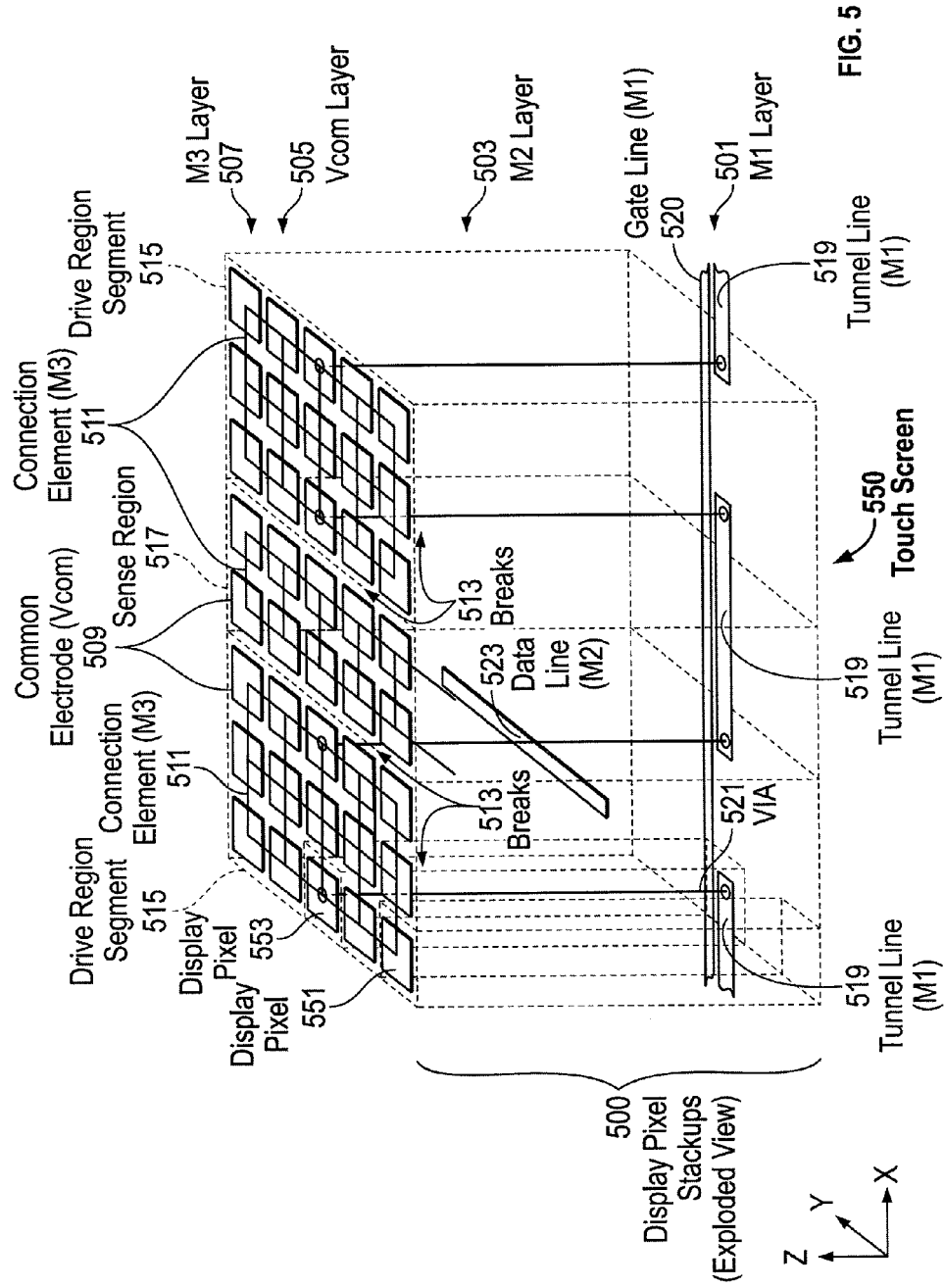
FIG. 5 illustrates an exploded view of example display node stackups according to examples of the disclosure.

FIG. 5 is a three-dimensional illustration of an exploded view (expanded in the z-direction) of example display node stackups 500 showing some of the elements within the node stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display node can include a common electrode 509, such as common electrodes 401 in FIG. 4 that is formed in Vcom layer 505. M3 layer 507 can include connection element 511 that can electrically connect together common electrodes 509. In some display nodes, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include tunnel lines 519 that can electrically connect together drive region segments 515 through connections, such as conductive vias 521, which can electrically connect tunnel line 519 to the grouped common electrodes in drive region segment display nodes. Tunnel line 519 can run through the display nodes in sense region 517 with no connections to the grouped common electrodes in the sense region, e.g., no vias 521 in the sense region. The M1 layer can also include gate lines 520. M2 layer 503 can include data lines 523. Only one gate line 520 and one data line 523 are shown for the sake of clarity; however, a touch screen can include a gate line running through each horizontal row of display nodes and multiple data lines running through each vertical row of display nodes, for example, one data line for each red, green, blue (RGB) color sub-node in each node in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other node stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, gate lines 520 can be held to a fixed voltage while stimulation signals can be transmitted through a row of drive region segments 515 connected by tunnel lines 519 and conductive vias 521 to form electric fields between the stimulated drive region segments and sense region 517 to create touch nodes, such as touch node 226 in FIG. 2. In this way, the row of connected together drive region segments 515 can operate as a drive line, such as drive line 222, and sense region 517 can operate as a sense line, such as sense line 223. When an object such as a finger approaches or touches a touch node, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch nodes to create an "image" of touch.

Figure 6:
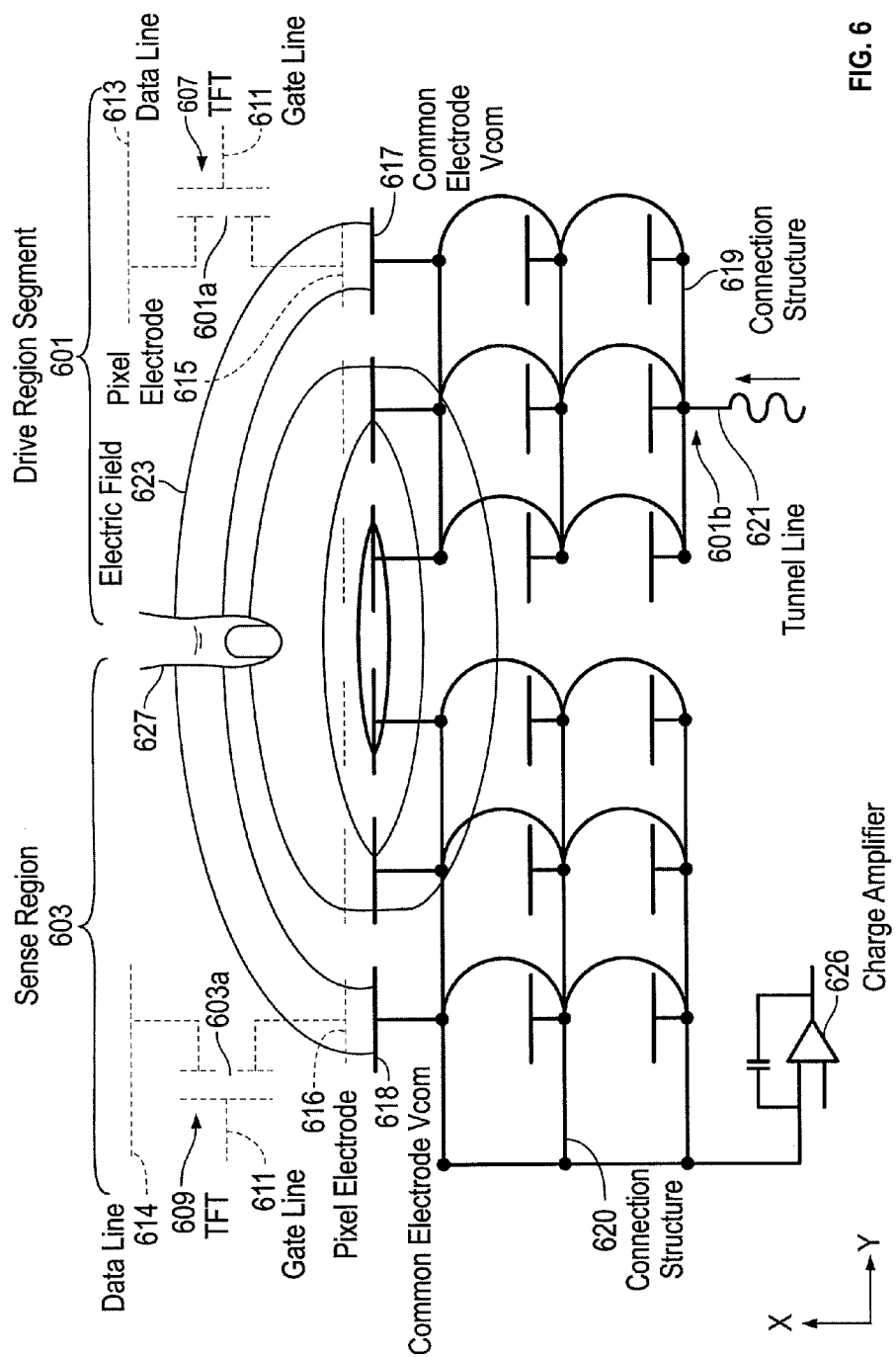
FIG. 6 illustrates an example touch sensing operation according to examples of the disclosure.

A touch sensing operation according to examples of the disclosure will be described with reference to FIG. 6. FIG. 6 shows partial circuit diagrams of some of the touch sensing circuitry within display nodes in a drive region segment 601 and a sense region 603 of an example touch screen according to examples of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display node 601a of drive region segment 601 and a single display node 603a of sense region 603. However, it is understood that other display nodes in drive region segment 601 can include the same touch sensing circuitry as described below for display node 601a, and the other display nodes in sense region 603 can include the same touch sensing circuitry as described below for display node 603a. Thus, the description of the operation of display node 601a and display node 603a can be considered as a description of the operation of drive region segment 601 and sense region 603, respectively.

Referring to FIG. 6, drive region segment 601 includes a plurality of display nodes including display node 601a. Display node 601a can include a TFT 607, a gate line 611, a data line 613, a pixel electrode 615, and a common electrode 617. FIG. 6 shows common electrode 617 connected to the common electrodes in other display nodes in drive region segment 601 through a connection element 619 within the display nodes of drive region segment 601 that is used for touch sensing as described in more detail below. Sense region 603 includes a plurality of display nodes including display node 603a. Display node 603a includes a TFT 609, a data line 614, a pixel electrode 616, and a common electrode 618. TFT 609 can be connected to the same gate line 611 as TFT 607. FIG. 6 shows common electrode 618 connected to the common electrodes in other display nodes in sense region 603 through a connection element 620 that can be connected, for example, in a border region of the touch screen to form an element within the display nodes of sense region 603 that is used for touch sensing as described in more detail below.

During a touch sensing phase, gate line 611 can be connected to a power supply, such as a charge pump, that can apply a voltage to maintain TFTs 609 in the "off" state. Drive signals can be applied to common electrodes 617 through a tunnel line 621 that is electrically connected to a portion of connection element 619 within a display node 601b of drive region segment 601. The drive signals, which are transmitted to all common electrodes 617 of the display nodes in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

Referring again to FIG. 5, it can be seen from FIG. 5 that some display nodes of touch screen 550 include different elements than other display nodes. For example, a display node 551 can include a portion of connection element 511 that has breaks 513 in the x-direction and the y-direction, and display node 551 does not include tunnel line 519. A display node 553 can include a portion of connection element 511 that has a break 513 in the x-direction, but not in the y-direction, and can include a portion of tunnel line 519 and a via 521. Other display nodes can include other differences in the configuration of stackup elements including, for example, no breaks 513 in connection element 511, a portion of tunnel line 519 without a via 521, etc.

The proximity of various circuit elements of integrated touch screens, such as touch screen 550, can result in coupling of signals between different systems of the touch screen. For example, noise that is generated by power systems, such as a gate line system that applies voltage to gate lines of the touch screen during a touch sensing phase, can be coupled into the touch sensing system, which can potentially corrupt touch sensing signals. Proximal electronics can work to corrupt touch sensing signals by presenting parasitic capacitive pathways that distort the measurement of the change in capacitance between the drive lines and the sense lines which are indicative of a touch on the touch panel.

FIG. 7a illustrates an example touch sensing circuit according to examples of the disclosure. As illustrated, touch sensing circuit 700 can include a drive line 706 that can be stimulated by a stimulation voltage source 702. Sense line 708 can be located proximally to drive line 706 such that charge on the drive line provided by stimulation voltage source 702 can be partially coupled via capacitive pathway 704 onto sense line 708. As discussed above, the amount of charge coupled onto the sense line 708 from drive line 706 can vary depending on the proximity of a finger or an object to the crossing of the drive line and sense line. The charge coupled onto the sense line can then be detected by sense circuitry 710, which can detect the changes in the mutual capacitance 704 between drive line 706 and sense line 708. The signal received by the detection circuitry can be characterized by equation 1 below:

$$(s*C_o)/(1+\tau_1*s) \quad (1)$$

wherein s represents the complex frequency, $C_o$ represents the mutual capacitance between the drive line 706 and sense line 708, and $\tau_1$ represents the RC time constant of the circuit.

FIG. 7b illustrates an example touch sensing circuit with parasitic capacitive pathways according to examples of the disclosure. As discussed above, the proximity of various electronics to touch detection hardware can create parasitic pathways that can work to distort the ability of the detection circuit 710 to accurately measure the change in capacitances associated with a finger or object touching or in close proximity to the device. FIG. 7b illustrates an example touch sensing circuit with parasitic capacitive pathways created by proximal gate lines. While parasitic capacitive pathways created by gate lines are shown for purposes of illustration, one skilled in the art would recognize that the disclosure is not so limiting and the concepts described below could be applied to parasitic capacitive pathways created by other electronics proximal to the touch sensing hardware, such as power circuitry or other display circuitry. As illustrated in FIG. 7b, the touch circuit described in FIG. 7a can contain parasitic capacitive pathways that are created by the proximity of a gate line 716. As illustrated, two such pathways can be created: the first, depicted by capacitor 712, can represent the mutual capacitance between the drive line 706 and the gate line 716. The second pathway, depicted by capacitor 714, can represent the mutual capacitance between the sense line 708 and the gate line 716.

When a stimulation signal is applied by the stimulation voltage source 702 to drive line 706, the parasitic capacitive pathways can create alternate ways for charge to be coupled onto the sense lines. As illustrated, the first pathway 722 can represent the mutual capacitance between the drive line 706 and the sense line 708 described above and characterized by equation (1) above. A second pathway 724 can be created via the mutual capacitance 712 between the drive line 706 and gate line 716, and the mutual capacitance 714 between the gate line 716 and the sense line 708. Charge from the stimulation voltage source 702 can be coupled to the gate line and from the gate line to the sense line. This series of couplings can thus couple a second signal onto sense line 708 for detection by the detection circuit 710. The signal created by the second pathway 724 can be characterized by the following equation:

$$(s^2*R_g*C_1*C_2)/(1+\tau_2*s) \quad (2)$$

wherein $R_g$ represents the effective resistance of the gate line (discussed in further detail below), $C_1$ represents the mutual capacitance between the drive line 706 and the gate line 716, $C_2$ represents the mutual capacitance between the sense line 708 and the gate line 716, and $\tau_2$ represents the RC time constant of the pathway 724. $\tau_2$ can be represented by the equation:

$$R_g*(C_1+C_2+C_3) \quad (3)$$

wherein $C_3$ represents the effective capacitance of the gate line 716. The effective capacitance of the gate line 716 can be an amalgamation of various capacitances created by display electronics such as the data lines, pixel electrodes and common electrodes discussed above. The effective resistance of the gate line $R_g$ can be a product of the metal used to create the gate lines.

Equation 4 below can represent the effective signal seen by detection circuitry 710, which is the combination of the signals from both pathways:

$$(s*C_o)/(1+\tau_1*s)+(s^2*R_g*C_1*C_2)/(1+\tau_2*s) \quad (4)$$

Figure 8:
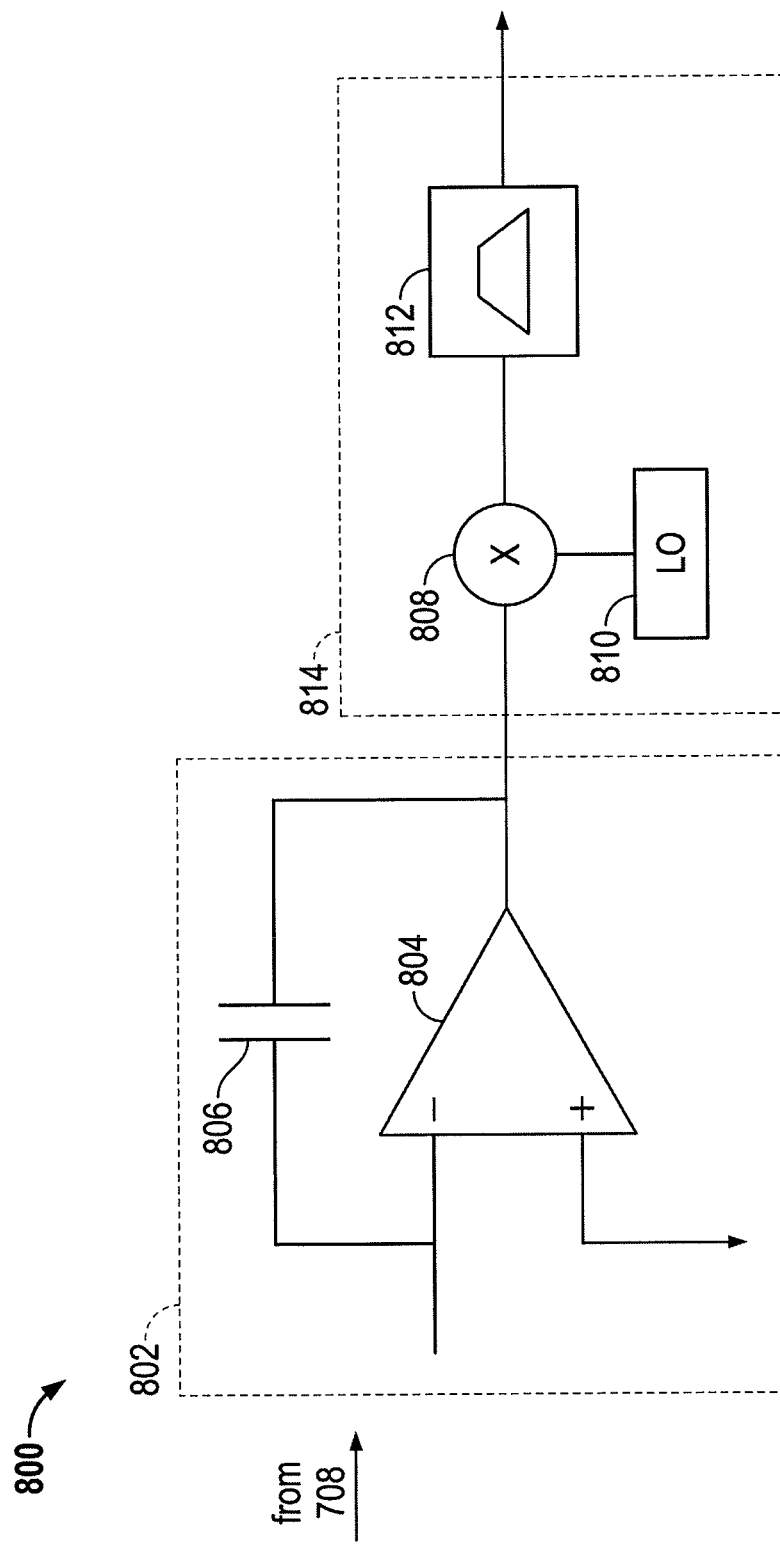
FIG. 8 illustrates an example touch sensing demodulation circuit according to examples of the disclosure.

FIG. 8 illustrates an example touch sensing detection and demodulation circuit according to examples of the disclosure. The detection circuitry 710 illustrated in FIGS. 7a and 7b can be implemented in a number of ways, including the circuit 800 depicted in FIG. 8. As illustrated, detection circuit 800 can include an analog front end (AFE) 802 that can include an operational amplifier 804 with feedback capacitor 806. The AFE can receive signals from the sense line 708 and can provide signal buffering and other pre-processing functions such as filtering prior to demodulation. Detection and demodulation circuit 800 can also contain a demodulator 814 that demodulates the signal and then filters it to spectrally isolate the desired data. Demodulator 814 can contain a mixer 808 that receives the output of the AFE 802 and a signal from a local oscillator (LO) 810 at its inputs. The output of the AFE 802 can be homodyned with the signal provided by LO 810 and the output of the mixer 808 can then be filtered and sent to a processor for further processing. In a homodyned demodulation architecture, the frequency and phase of the LO can be tuned to the frequency and phase of the signal appearing at the output of the AFE 802 in order to maximize the magnitude of the detected signal after detection. However, due to the parasitic capacitance pathways discussed above in reference to FIG. 7b, two signals can appear at the output of the AFE 802, the first signal corresponding to the mutual capacitance between the drive and sense lines that is the desired signal to be detected, and a second signal created by the parasitic pathways described above that can act as noise to the desired signal. Due to the presence of these two signals, tuning the phase of the LO can present an opportunity to maximize the magnitude of desired signal while at the same time minimizing the magnitude of the noise signal.

Figure 9A:
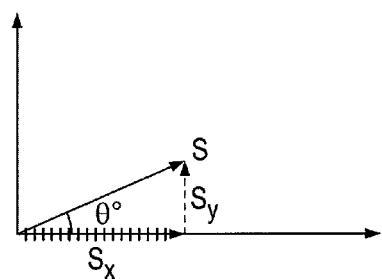
FIGS. 9A-9C illustrate various relationships between the phase of a signal and the phase of a local oscillator according to examples of the disclosure.
Figure 9B:
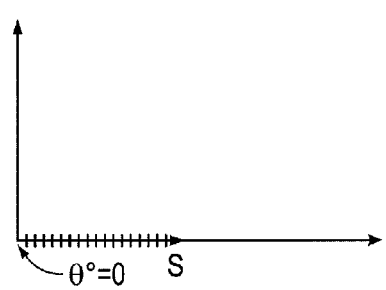
Figure 9C:
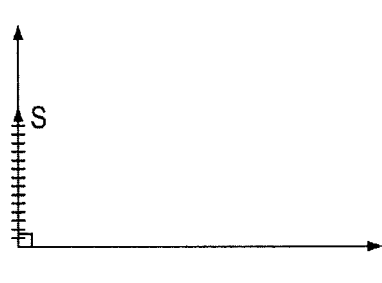

FIGS. 9A-9C illustrate various relationships between the phase of a signal and the phase of a local oscillator. The vector diagrams of FIG. 9a-c can help to illustrate the relationship between a signal phase and the LO phase, and the resultant signal that can be produced by a mixer, given the phase relationship between the signal and the LO. For instance, in FIG. 9a, the signal can be represented by a vector S in which the magnitude of the vector is expressed as a length of the vector and the phase of the vector can be expressed as an angle of incidence with x-axis of the vector diagram. The x-axis of the diagram can be made parallel to the phase of the LO, such that any angle of incidence between the vector S and the x-axis can be indicative of the phase discrepancy between the signal and the LO. In FIG. 9a, the vector S has an angle of incidence of θ with the x-axis, thus being indicative of a phase discrepancy of θ° between the signal and the LO. The vector S can be resolved into 2 components, one that is parallel to the x-axis, and one that is orthogonal to the x-axis, i.e. the y-axis. As known to one skilled in the art, it is the component of the vector that is parallel to the x-axis that appears on the output of the mixer, while the component of the vector that is orthogonal to the x-axis does not appear at the output of the mixer and is cancelled out via destructive interference. Thus, turning back to FIG. 9a, the vector S can be resolved into x and y components $S_x$ and $S_y$, respectively, wherein $S_x$ can appear at the output of the mixer, after having mixed the LO with the signal S, and $S_y$ can be cancelled out via destructive interference. The resultant vector $S_x$ can thus appear at the output of the mixer; however, its magnitude can be diminished by an amount equivalent to the magnitude of the orthogonal component of the signal $S_y$ that was cancelled out.

FIG. 9b can illustrate the example in which the LO is tuned to match the phase of the signal S. In such an example the angle of incidence θ to the x-axis can be θ°. Therefore, when vector S is resolved into its x and y components, the x component $S_x$ can be equal to the magnitude of the original vector S and the y component $S_y$ is zero. Thus, the LO can be tuned such that the phase can be matched to the signal S, and the output of the mixer can be maximized. FIG. 9c can illustrate the example in which the LO can be tuned to be orthogonal to the phase of the signal S. In such an example the angle of incidence θ to the x-axis can be 90°. Therefore, when vector S is resolved into its x and y components, the x component $S_x$ can be zero, while the y component can be equal to the magnitude of the vector S. However, since the y component can represent the portion of the signal that is destructively interfered with, the output of the mixer can be approximately 0 since there is no x component to the vector S.

Figure 10A:
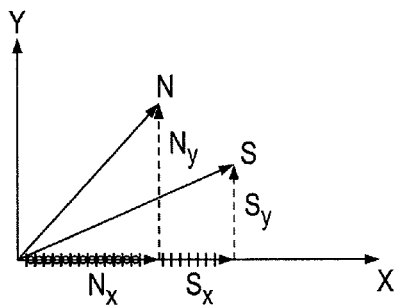
FIGS. 10A-10C illustrate various relationships between the phase of a signal, the phase of a noise signal, and the phase of a local oscillator according to examples of the disclosure.
Figure 10B:
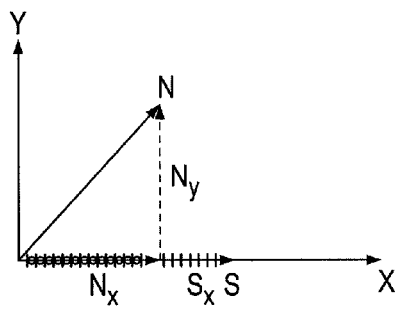
Figure 10C:
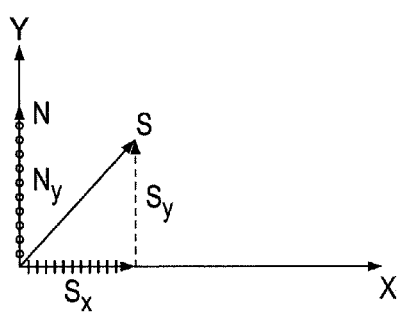

FIGS. 10A-10C illustrate various relationships between the phase of a signal, the phase of a noise signal, and the phase of a local oscillator according to examples of the disclosure. As discussed above, the parasitic capacitance pathway created by proximal electronics can act as a noise signal during touch detection. FIGS. 10a-10c can illustrate various phase relationships between the touch signal S, the parasitic capacitance signal N and the LO of the demodulator. FIG. 10a illustrates an example relationship in which both a noise signal N and a touch signal S can be out of phase with the LO. As illustrated, signal S and signal N can be resolved into their x and y components. As discussed above, the x components can be produced at the output of a mixer while the y components can be cancelled out. Therefore when both signals S and N are present, the mixer can output $N_x$ and $S_x$ while $N_y$ and $S_y$ can be cancelled out. The presence of $N_x$ along with $S_x$ at the output of the mixer can lead to a diminished signal to noise ratio during touch detection. A diminished signal to noise ratio can lead a touch input device to detect false touches, i.e. detecting a touch when no touch is actually present, or failing to detect touch input events that have occurred on the device.

FIG. 10b illustrates the relationship of phase between the noise signal, the touch signal and the LO, when the LO is tuned to match the phase of the touch signal. The magnitude of the touch signal as seen at the output of the mixer can equal $S_x$ as the touch signal would no longer have an orthogonal component relative to the phase of the LO. By tuning the LO phase to match the phase of the touch signal, the magnitude of the touch signal seen on the output of the mixer can be maximized. However, since the LO is not tuned to the noise signal, the noise vector N can have a horizontal/in-phase component $N_x$ and a vertical/orthogonal component $N_y$. As discussed above, the horizontal/in-phase component $N_x$ may be produced at the output of the mixer while the vertical/orthogonal component may be cancelled out. Since the $N_y$ component of the noise signal N may be cancelled out by the mixer, the magnitude of the noise signal appearing at the output of the mixer may be reduced as compared to the original signal pre-mixer. Therefore, when the LO is tuned to match the phase of the touch signal, the touch signal can see its magnitude maximized while the noise signal is diminished due to its orthogonal component being destructively interfered with. Nonetheless, the signal-to-noise ratio can be diminished by the presence of noise created by parasitic pathways even when the LO is tuned to match the phase of the touch signal.

FIG. 10c illustrates the relationship of phase between the noise signal, the touch signal and the LO, when the LO is tuned to be orthogonal to the phase of the noise signal. As illustrated, by tuning the LO to be orthogonal (i.e., 90° out of phase) to the noise signal, the noise signal vector N will not have an in-phase/horizontal component, in other words Nx=0. Thus the output of the mixer can be free of any noise signal component. However, as illustrated, the touch signal S can suffer a degradation at the output of the mixer, since the orthogonal component of the touch signal Sy can be cancelled out by destructive interference with the LO signal. Nonetheless, by tuning the LO phase to be orthogonal to the noise signal, thus effectively cancelling out the noise through destructive interference, the signal to noise ratio at the output of the mixer can be maximized.

The phase of the LO can be tuned at the time of manufacture of the device. The LO can be tuned when no touch signal is present so as to ensure that the LO is being tuned to the noise signal only. When the output of the mixer is minimized in response to the tuned LO phase, the phase calibration process can be terminated. While the phase of the LO can be tuned to be orthogonal to the noise signal at the time of manufacture, the noise signal can dynamically change phase during operation of the device.

For example, as discussed above, circuitry associated with the display can create parasitic capacitive pathways on the touch detection circuitry. The parasitic capacitive pathways and their coupling behavior with the touch detection circuitry can be affected by the signals being transmitted at any particular time by the display circuitry. For example, if a particular area of the display is displaying a bright color then the parasitic capacitance imparted to the touch detection circuit can be different in terms of phase and magnitude than if the color were dull. In another example, exposure of the device to hot and cold environments can change the resistivity of the metal that makes up the proximal electronics. As discussed above, the noise signal can depend on the resistivity of the metal and thus the temperature of the device can change the phase of the noise signal. In other examples, the phase of the noise signal can be affected by the age of the device, and certain parameters of the display electronics such as resistivity and capacitance can change over time. Due to the dynamic nature of the parasitic capacitance experienced by the touch detection circuitry, the phase of the LO may at times no longer be orthogonal to the phase of the noise. As discussed above, a lack of orthogonality can result in degradation to the signal to noise ratio of the touch detection circuit. While it has been empirically determined that the changes to the phase of the noise signal in response to the dynamic changes in parasitic capacitance can be small, nonetheless any loss of orthogonality between the noise signal phase and the LO phase can result in a significant degradation to SNR.

FIG. 11 illustrates an example method of dynamically adjusting a local oscillator phase according to examples of the disclosure. At a first step S1100 the magnitude of the measured signal at the output of the touch detection circuit can be measured. The method then can move to step 1102 in which the resistivity of the gate line can be dithered, or in other words temporarily changed and then reverted back to its original state. A more detailed discussion of dithering can be found below. The method can then move to step 1104 where the magnitude of the signal is measured again and a change in the magnitude of the signal as a result of the dithering of the resistivity can be determined. The method can then move to step 1106 where the determined change in magnitude can be compared against a pre-determined threshold.

Due to the sinusoidal nature of the signals involved touch detection, if the LO is tuned to be orthogonal to noise signal or approximately orthogonal, then the dithering of the resistivity of the gate line can cause a change in magnitude of the noise signal that is less than the change in magnitude of the noise signal had the LO not been tuned to be orthogonal to the noise signal. Therefore a pre-determined threshold can be established such that based on the change in magnitude of the noise signal caused by the dithering, the device can determine whether the LO is approximately tuned to be orthogonal to the noise signal or if the LO phase should be adjusted. Thus at step 1106 if the change in magnitude is found to be less than the pre-determined threshold then the method can move to step 1108 and the LO tuning method can be terminated. If the change in magnitude is above a pre-determined threshold, than the method can move to step 1110 where the LO phase is adjusted by a pre-determined amount and the process is repeated.

Figure 12:
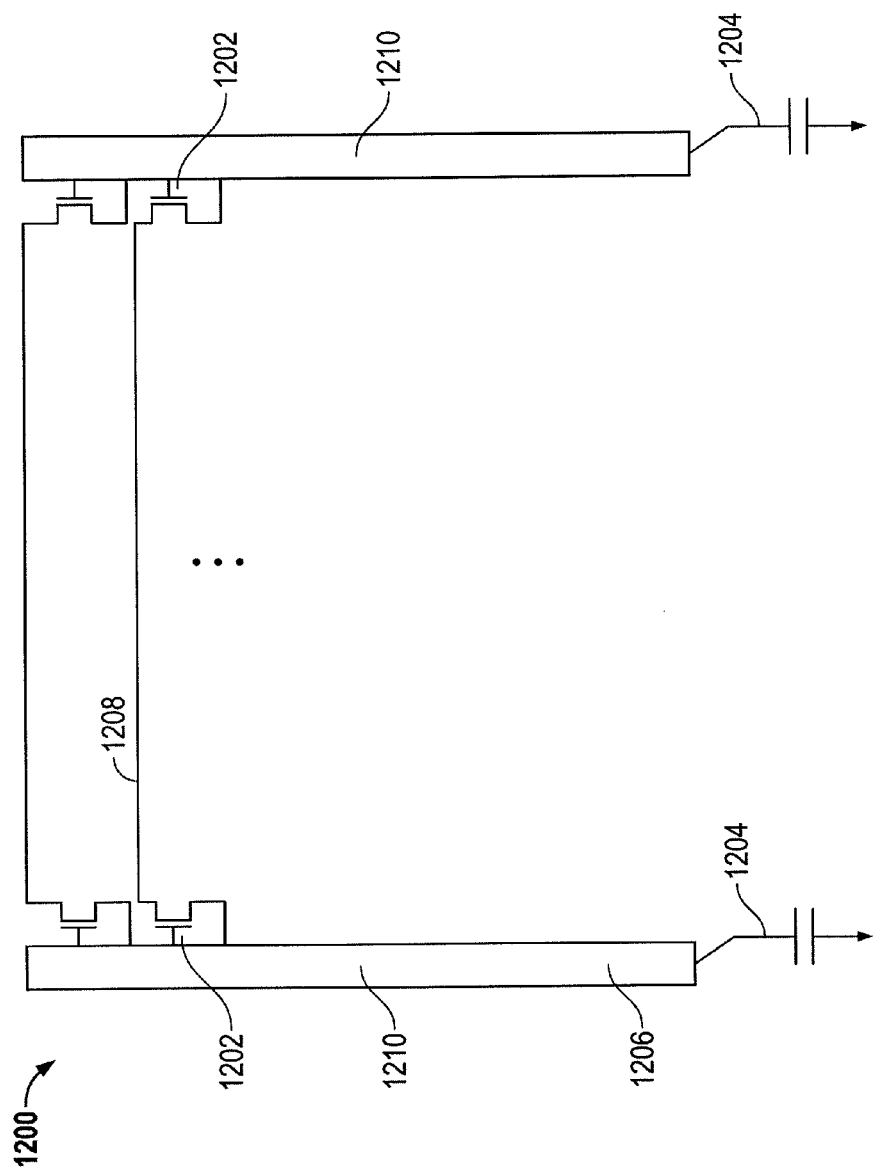
FIG. 12 illustrates an example gate line voltage system according to examples of the disclosure.

In order to illustrate methods of dithering the resistance of the gate lines, the structure of the gate lines can be examined in order to identify areas in which the resistance can be changed to produce the dithering effect. FIG. 12 illustrates an example gate line voltage system according to examples of the disclosure. Gate line voltage system 1200 can consist of gate lines 1208, each row of the display having its own gate line. The gate lines 1208 can be connected at its ends to a tail TFT (thin film transistor) 1202, for the purpose of selectively turning on and off a gate line at a given time. Each tail TFT 1202 can be connected to a voltage gate line (VGL) unit 1210 whose purpose can be to provide varying voltages to each individual gate line. VGL unit 1210 can be connected to reservoir capacitor 1204. Reservoir capacitor 1204 can be connected to the VGL unit 1210 to allow the gate lines to maintain their voltage during time periods in-between refreshing the rows of the display. The gate lines 1208, tail TFTs 1202, VGL units 1210 and reservoir capacitors can all contribute to the effective resistance of the gate line.

Figure 13:
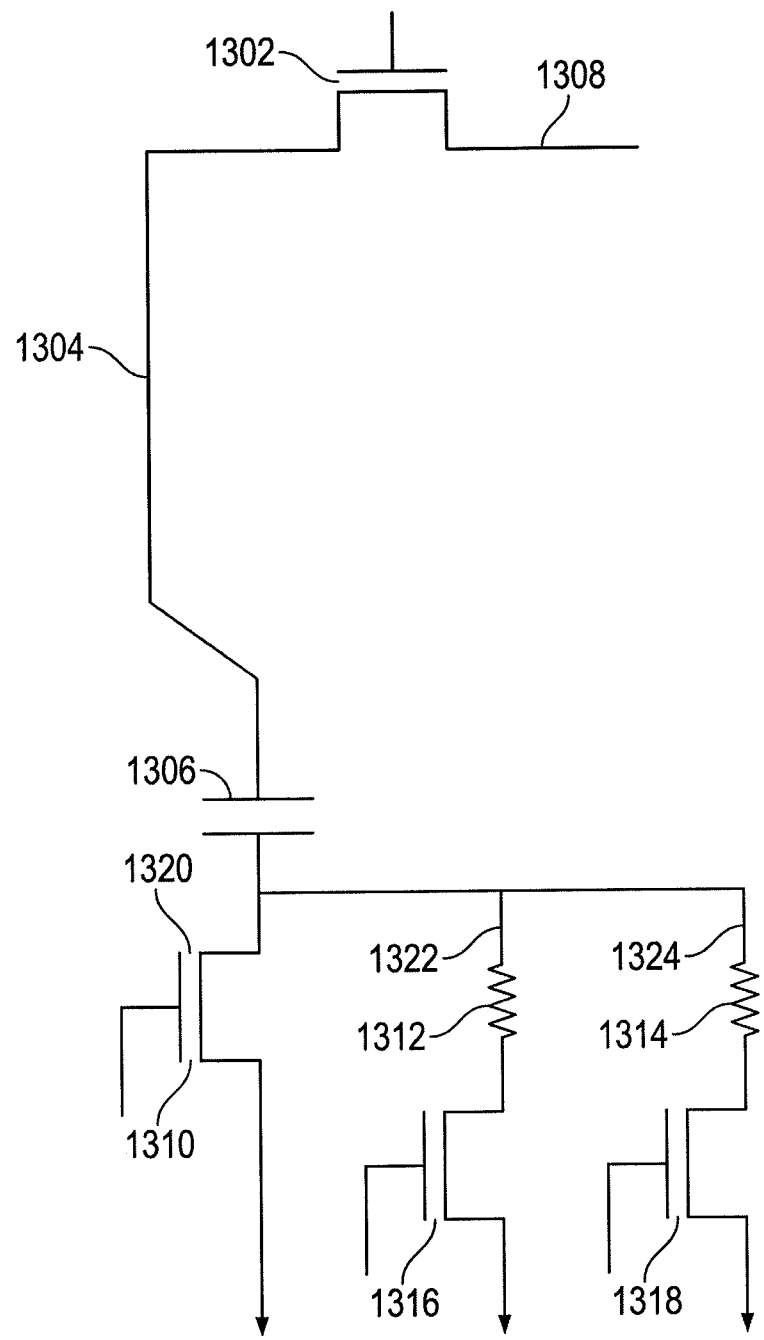
FIG. 13 illustrates an example method of dithering the resistance of a gate line voltage system.

FIG. 13 illustrates an example method of dithering the resistance of a gate line voltage system. For purposes of illustration the circuit of FIG. 12 has been simplified to illustrate only one row of the gate line voltage system. As described in reference to FIG. 12, gate line 1308 can be connected to tail TFT 1302. Tail TFT 1302 can be connected to reservoir capacitor 1306 via VGL trace 1304. As shown in FIG. 12, the reservoir capacitor 1204 can be connected to ground or another reference voltage. In the example of FIG. 13, the reservoir capacitor 1306 can be connected to a network of paths to ground. Each path can have differing resistances and can be selectively activated and deactivated using transistors. For instance, path 1320 can include a transistor 1310 that can selectively connect the reservoir capacitor 1306 to ground. Path 1322 can include resistor 1312 and transistor 1316. When path 1320 is activated via transistor 1316, the gate line voltage system can have an effective resistance R1. If path 1320 is deactivated and path 1322 is activated, due to the resistor 1312, path 2 can change the effective resistance of the gate line voltage system to R2. R1 and R2 can be different values. By selectively activating path 1320 and 1322, the device can control the value of the effective resistance of the gate line voltage system, and thus it can effectively dither the resistance of the gate line according to the description in FIG. 11. Multiple pathways can be created, with each path imparting a different resistance on the gate line voltage system. For instance, path 1324 can have a resistor 1314 whose resistance differs from the resistor 1312 of path 1322. Paths 1320, 1322 and 1324 can be selectively activated and deactivated in different combinations to produce different gate line resistances as desired by the device in order to effectively dither the resistance of the gate line.

Figure 14:
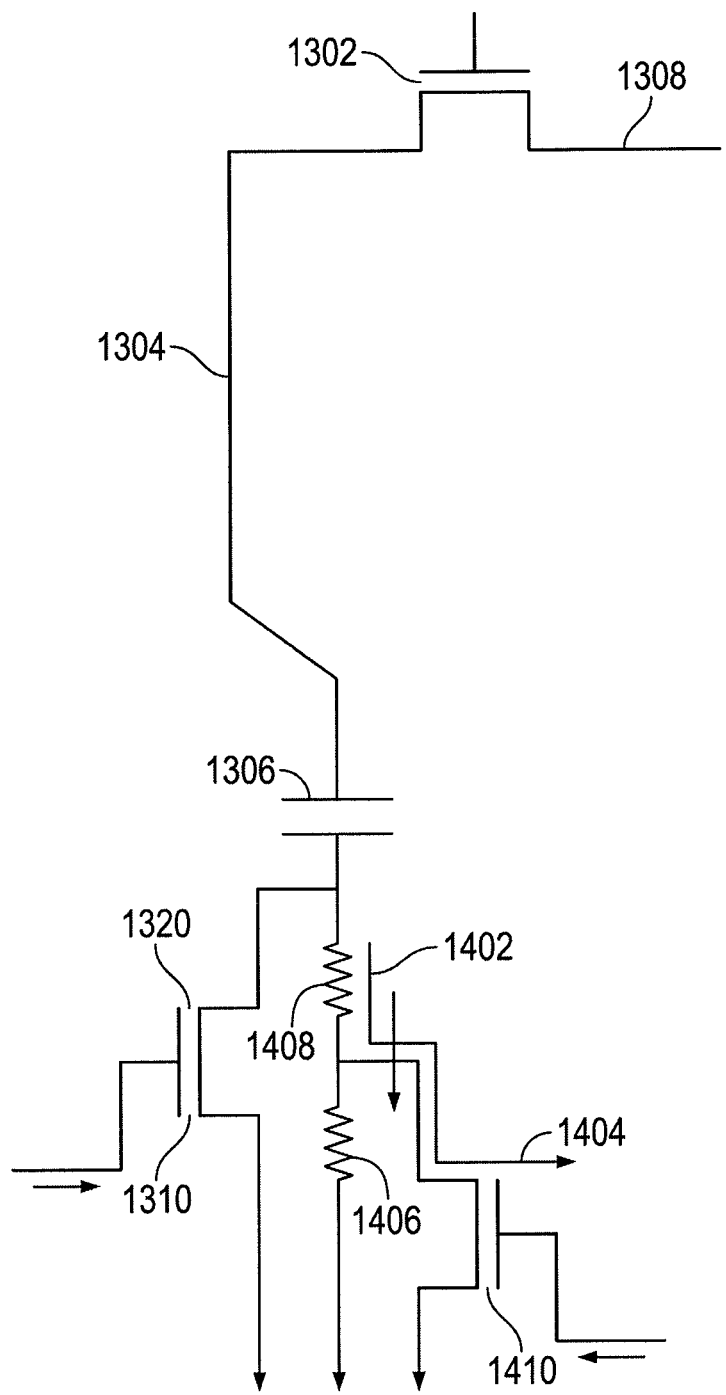
FIG. 14 illustrates another example method of dithering the resistance of a gate line voltage system.

FIG. 14 illustrates another example method of dithering the resistance of a gate line voltage system. Reservoir capacitor 1306 can be connected to ground via pathway 1402 that goes through resistors 1406 and 1408. Transistors 1310 and 1410 can be used to create alternative pathways to connect reservoir capacitor 1306 to ground. For instance, when transistor 1310 is activated, reservoir capacitor 1306 can be connected to ground directly, thus bypassing resistors 1406 and 1408. When transistor 1310 is deactivated and transistor 1410 is activated, reservoir capacitor 1306 can be connected to ground via resistor 1408 while bypassing resistor 1406. In this way, by selectively activating and deactivating transistors 1310 and 1410, three separate paths to ground can be created for reservoir capacitor 1306, each path carrying a different effective resistance, thus changing the overall resistance of the voltage gate line system.

Figure 15:
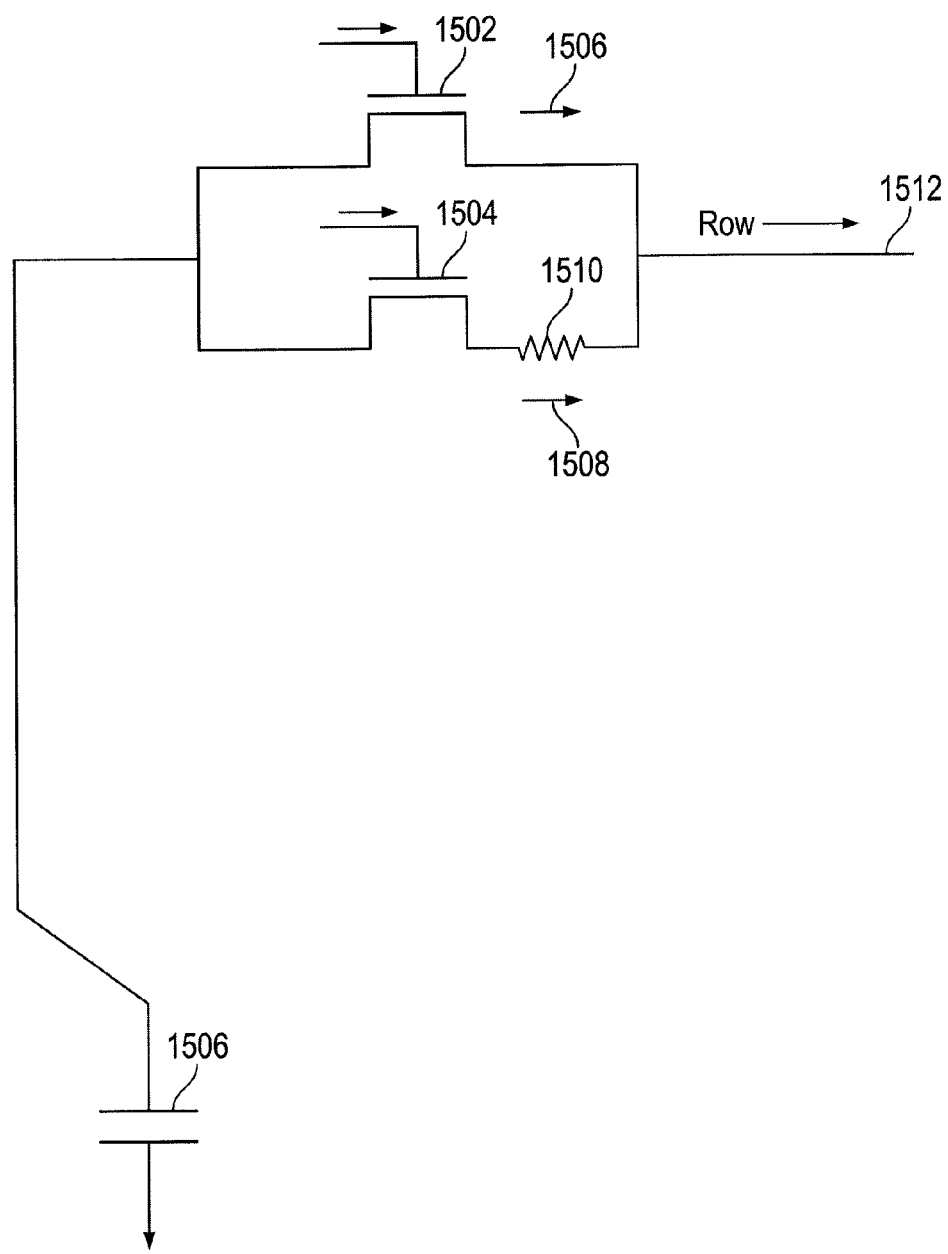
FIG. 15 illustrates another example method of dithering the resistance of a gate line voltage system.

FIG. 15 illustrates another example method of dithering the resistance of a gate line voltage system. In this example, alternate paths between the gate line 1512 and the reservoir capacitor 1506 can be created, with each path imparting a different resistance on the gate line, thus changing the effective gate line resistance seen by the touch detection system. In the example of FIG. 15, two separate tail TFTs 1502 and 1504 can be connected to an individual gate line 1512. When tail TFT 1502 is activated it creates path 1506 between gate line 1512 and reservoir capacitor 1506. When tail TFT 1504 is activated, it can create path 1508 between gate 1512 and reservoir capacitor 1506. Tail TFT 1504 can be larger than tail TFT 1502. By choosing tail TFT 1504 to be larger than tail TFT 1502, when tail TFT 1504 is activated, the effective resistance path differs from the effective resistance of path 1506, thus creating the dithering effect as described above.

The choice of dithering the tail TFT paths as illustrated in FIG. 15 versus dithering the grounding paths for the reservoir capacitors as illustrated in FIGS. 13 and 14 can provide certain advantages and disadvantages. For instance while dithering the reservoir capacitor path can be less complex than dithering the tail TFTs (there is one tail TFT for every row of the display, whereas there is only two reservoir capacitors for the display), the effective gate line resistance seen at every row can be changed, meaning that control of the gate line resistance is done at the display level rather than at the row level. In contrast, by dithering the each tail TFT path, the control of the effective gate line resistance can be localized to each individual row. This may be advantageous if each LO in the touch detection circuit is used for only one localized area of the display, thus providing a more precise tuning to the LO at each localized area of the display.

The change in magnitude caused by dithering can be measured in many different ways. In one example, a touch image can be obtained while the effective resistance of the gate line is held at a particular value. After the image is obtained, the effective resistance of the gate line can be changed and another touch image obtained. The change in magnitude between the two touch images can be compared to determine the change in magnitude. In another example, the process above can be repeated over many touch images, and the magnitude of each touch image can be integrated over time to determine the change in magnitude. In this way, any changes in magnitude caused by other noise sources or variations due to system conditions can be integrated out, thus ensuring that the change in magnitude detected is caused by the dithering.

In the above example, the change in magnitude due to dithering can be determined only after multiple touch images have been obtained. This can mean that the LO phase can lose orthogonality and then regain orthogonality only after multiple touch images have been rendered. In other examples the change in magnitude due to dithering can be determined during one touch image by dithering the effective resistance of the gate line at a fixed frequency. For example, by dithering the gate resistance at a fixed frequency that is different from the stimulation frequency of the touch signal, the change in magnitude of the touch signal caused by the dithering can be spectrally separated from the touch signal. As discussed above with respect to equations 1-4, the touch signal and the noise signal can appear at the same frequency based on the stimulation signal provided to the touch detection section. By dithering the gate line resistance at a fixed frequency, the change in magnitude of the noise signal caused by the dithering can be spectrally isolated.

Figure 16:
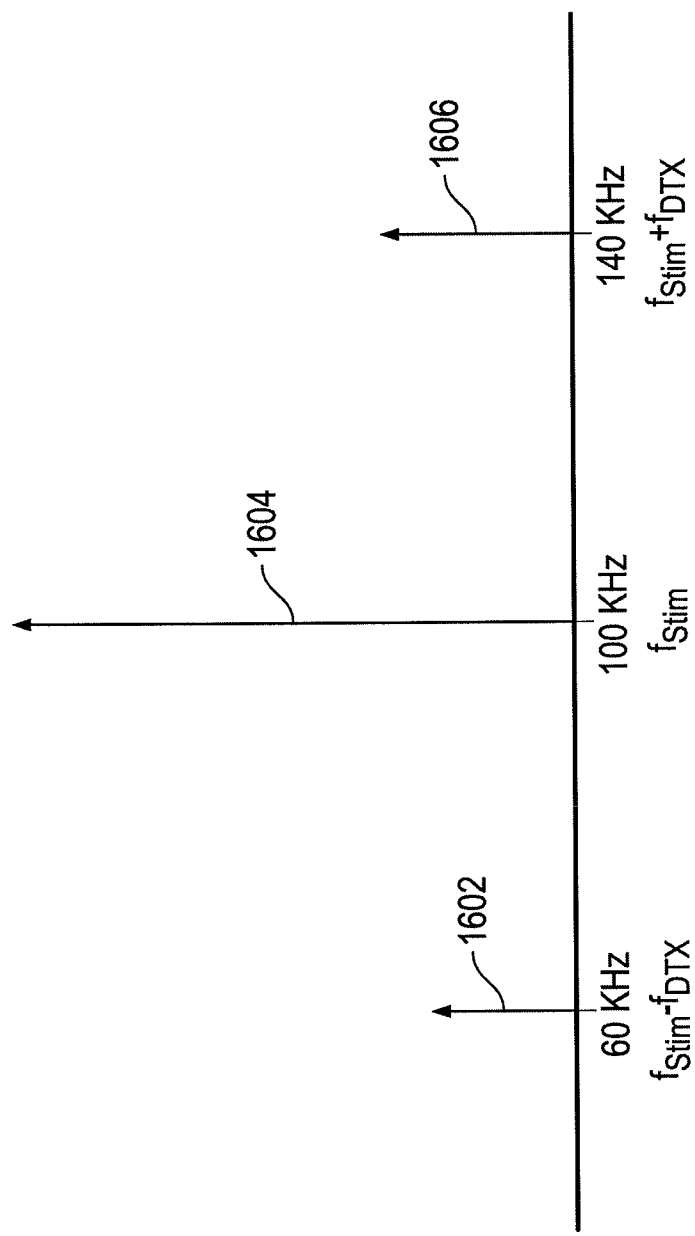
FIG. 16 illustrates an example frequency response of a detected touch and noise signal according to examples of the disclosure.

FIG. 16 illustrates an example frequency response of a detected touch and noise signal according to examples of the disclosure. As illustrated, signal 1604 can represent the touch signal that is modulated at a frequency $F_{stim}$. For purposes of illustration, Fstim is shown as being 100 KHz. If the effective gate line resistance is modulated at a frequency of 40 KHz than signals that are representative of the change in magnitude of the noise signal due to dithering can appear at 140 KHz (signal 1606) and at 60 KHz (signal 1602) on the frequency spectrum. Since the magnitude of signals 1602 and 1606 are dependent on the change in magnitude due to dithering, they can be used to determine the orthogonality of the LO phase to the noise phase as discussed above.

Figure 17:
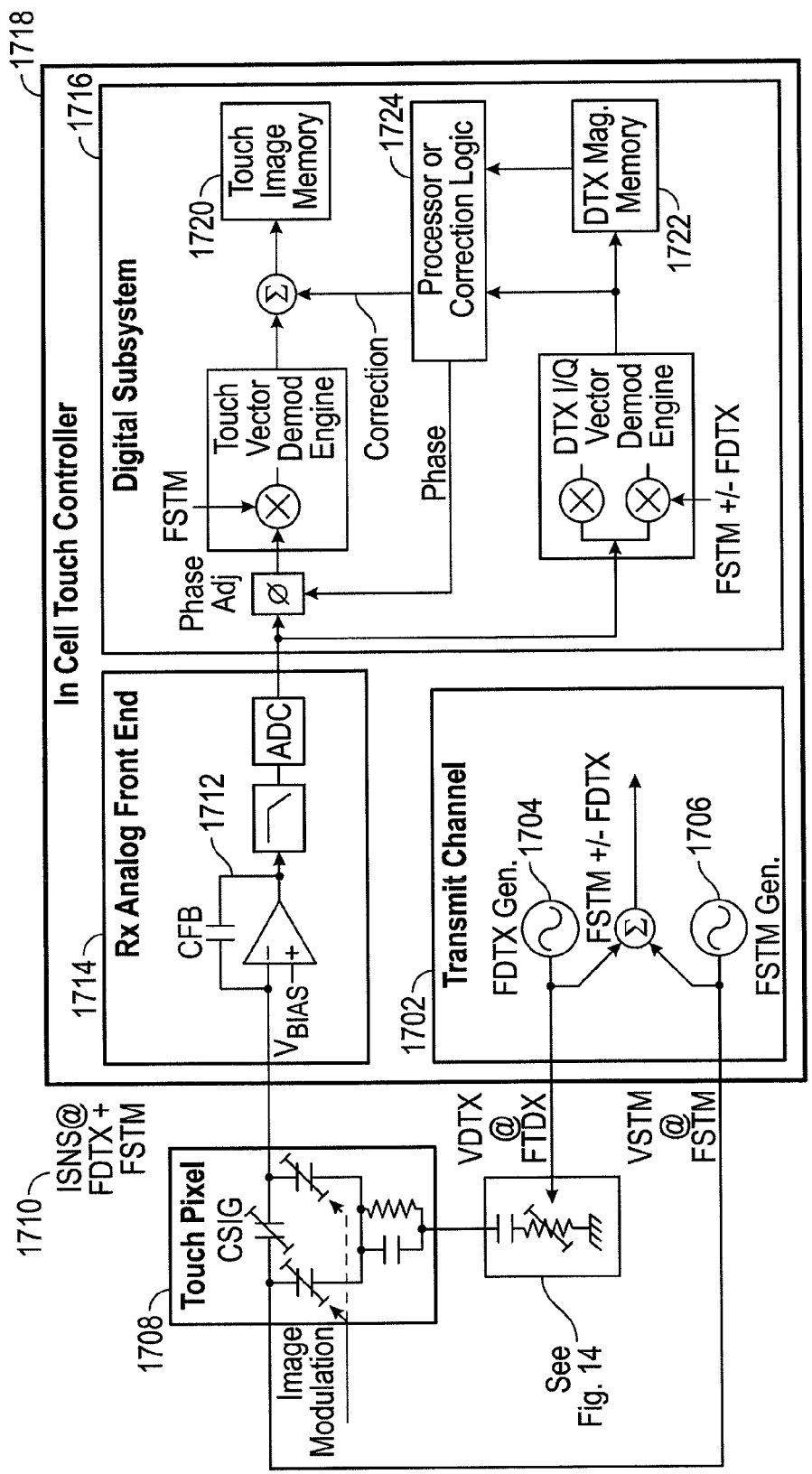
FIG. 17 shows an exemplary embodiment of an in-cell touch controller with additional features for DTX compensation.

FIG. 17 shows an exemplary embodiment of an in-cell touch controller with additional features for DTX compensation. A transmit channel 1702 can generate signals VDTX from FDTX generator 1704 and VSTM from FSTM generator 1706. VDTX can have the frequency of the gate line impedance dithering signal and VSTM can be the touch stimulus frequency FSTM which is used to detect touch inputs. As VSTM passes through the touch pixel 1708 it can pass through CSIG which can represent the mutual capacitance between a drive line and sense line as described above. VSTM can also pass through the DTX path described in FIG. 7 that flows through C1, C2, RG and CG. Because C1 and C2 can vary as a function of the pixel voltage levels, their value can be dependent on the image being produced by the display. Therefore, signal ISNS 1710 into the sense amplifier 1712 of RX analog front end 1714 can have two components, one being ISIG the component of the signal created by VSTM the other IDTX which can be the component created by VDTX, the latter being image dependent. Dithering of the gate line impedance at FDTX can cause the IDTX component to be mixed with the stimulus of frequency FSTM passing through the DTX network. Therefore the frequency of IDTX can have a frequency FSTM+/−FDTX, as shown in FIG. 16.

The RX analog front end 1714 can convert, filter and digitize this signal for further processing by a digital subsystem 1716. Two demodulation paths can be provided. The primary demodulation path can demodulate the touch signal at frequency FSTM, the secondary demodulation path can demodulate the DTX component at FSTM+/−FDTX. The secondary demodulation path can use an I/Q vector demodulator know in the art, in order to calculate the magnitude of the DTX signal. The in-cell touch controller 1718 can post the touch and DTX magnitude in touch image memory 1720 and DTX magnitude memory 1722, respectively. Either a processor and/or correction logic 1724 can adjust the phase of the signal into the primary demodulation path based on the DTX magnitude as to minimize the DTX component, as outlined in FIGS. 10 and 11. Similarly, processor and/or correction logic 1724 can apply correction to the touch data before and/or after a touch scan completes. Applying correction can involve addition, subtraction, division or multiplication of correction factors during touch scanning and/or after touch scanning completes.

Therefore, according to the above, some examples of the disclosure are directed to a method of dynamically reducing the effect of noise on a touch sensor panel, the method comprising measuring a detected touch signal, dithering a parameter of a circuit element proximal to the touch sensor panel, measuring a change in the detected touch signal caused by the dithering, comparing the change to a pre-determined threshold, and adjusting a demodulation phase if the change in touch signal is above the pre-determined threshold. Additionally or alternatively to one or more of the examples disclosed above, in some examples, dithering a parameter of a circuit element proximal to the touch sensor panel includes dithering an effective resistance of the circuit element. Additionally or alternatively to one or more of the examples disclosed above, in some examples, the circuit element includes a gate line of a display. Additionally or alternatively to one or more of the examples disclosed above, in some examples, dithering the effective resistance of a gate line includes dithering a resistance associated with a reservoir capacitor of the gate line. Additionally or alternatively to one or more of the examples disclosed above, in some examples, dithering the effective resistance of a gate line includes dithering a resistance associated with a tail TFT of the gate line. Additionally or alternatively to one or more of the examples disclosed above, in some examples, measuring a change in the detected touch signal caused by the dithering includes dithering the parameter over a plurality of touch images, and comparing the plurality of touch images to determine the change. Additionally or alternatively to one or more of the examples disclosed above, in some examples, measuring a change in the detected touch signal caused by the dithering includes dithering the parameter at a fixed frequency during an acquisition of a touch image, acquiring a touch image, and filtering the acquired touch image so as to isolate a portion of the acquired touch image correlated to the dithering of the parameter. Additionally or alternatively to one or more of the examples disclosed above, in some examples, the demodulation phase is adjusted such that the phase is orthogonal to a phase of the cross-talk noise.

Some examples of the disclosure are directed to a touch input device configured to reduce the effects of noise, the touch input device comprising a processor capable of measuring a detected touch signal, dithering a parameter of a circuit element proximal to the touch sensor panel, measuring a change in the detected touch signal caused by the dithering, comparing the change to a pre-determined threshold, and adjusting a demodulation phase if the change in touch signal is above the pre-determined threshold. Additionally or alternatively to one or more of the examples disclosed above, in some examples, dithering the parameter of the circuit element proximal to the touch sensor panel includes dithering an effective resistance of the circuit element. Additionally or alternatively to one or more of the examples disclosed above, in some examples, the circuit element includes a gate line of a display. Additionally or alternatively to one or more of the examples disclosed above, in some examples, dithering the effective resistance of a gate line includes dithering a resistance associated with a reservoir capacitor of the gate line. Additionally or alternatively to one or more of the examples disclosed above, in some examples, dithering the effective resistance of a gate line includes dithering a resistance associated with a tail TFT of the gate line. Additionally or alternatively to one or more of the examples disclosed above, in some examples, measuring a change in the detected touch signal caused by the dithering includes dithering the parameter over a plurality of touch images, and comparing the plurality of touch images to determine the change in the touch signal. Additionally or alternatively to one or more of the examples disclosed above, in some examples, measuring a change in the detected touch signal caused by the dithering includes dithering the parameter at a fixed frequency during an acquisition of a touch image, acquiring a touch image, and filtering the touch image so as to isolate a portion of the acquired touch image correlated to the dithering of the parameter. Additionally or alternatively to one or more of the examples disclosed above, in some examples, the demodulation phase is adjusted such that the phase is orthogonal to a phase of the cross-talk noise.

Some examples of the disclosure are directed to a non-transitory computer readable storage medium having stored thereon a set of instructions for reducing the effects of noise in a touch sensor panel, that when executed by a processor causes the processor to measure a detected touch signal, dither a parameter of a circuit element proximal to the touch sensor panel, measure a change in the detected touch signal caused by the dithering, compare the change to a pre-determined threshold, and adjust a demodulation phase if the change is above the pre-determined threshold. Additionally or alternatively to one or more of the examples disclosed above, in some examples, dithering a parameter of a circuit element proximal to the touch sensor panel includes dithering an effective resistance of the circuit element. Additionally or alternatively to one or more of the examples disclosed above, in some examples, the circuit element includes a gate line of a display. Additionally or alternatively to one or more of the examples disclosed above, in some examples, dithering the effective resistance of a gate line includes dithering a resistance associated with a reservoir capacitor of the gate line. Additionally or alternatively to one or more of the examples disclosed above, in some examples, dithering the effective resistance of a gate line includes dithering a resistance associated with a tail TFT of the gate line. Additionally or alternatively to one or more of the examples disclosed above, in some examples, measuring a change in the detected touch signal caused by the dithering includes dithering the parameter over a plurality of touch images, and comparing the plurality of touch images to determine the change in the touch signal. Additionally or alternatively to one or more of the examples disclosed above, in some examples, measuring a change in the detected touch signal caused by the dithering includes dithering the parameter at a fixed frequency during an acquisition of a touch image, acquiring a touch image, and filtering the touch image so as to isolate a portion of the acquired touch image correlated to the dithering of the parameter. Additionally or alternatively to one or more of the examples disclosed above, in some examples, the phase of the local oscillator is adjusted such that the phase is orthogonal to a phase of the cross-talk noise.

Some examples of the disclosure are directed to a touch input device configured to reduce the effects of noise, the touch input device comprising a plurality of signal generators, at least one of the plurality of signal generators configured to generate a first stimulation signal and at least one of the plurality of signal generators configured to generate a second stimulation signal, a plurality of first circuit elements configured to detect a touch input on the touch input device, a plurality of second circuit elements, the plurality of second circuit elements located proximal to the plurality of second circuit elements, and a processor capable of driving the first circuit elements with the first stimulation signal, measuring a detected touch signal, driving the second circuit elements with the second stimulation signal, measuring a change in the detected touch signal caused by the dithering, comparing the change to a pre-determined threshold, and adjusting a demodulation phase if the change in touch signal is above the pre-determined threshold. Additionally or alternatively to one or more of the examples disclosed above, in some examples, driving the second circuit elements with the second stimulation signal includes dithering a parameter of the plurality of second circuit elements. Additionally or alternatively to one or more of the examples disclosed above, in some examples, dithering a parameter of the plurality of second circuit elements further includes dithering an effective resistance of the circuit element. Additionally or alternatively to one or more of the examples disclosed above, in some examples, the plurality of second circuit elements include a gate line of a display. Additionally or alternatively to one or more of the examples disclosed above, in some examples, dithering the effective resistance of a gate line includes dithering a resistance associated with a reservoir capacitor of the gate line. Additionally or alternatively to one or more of the examples disclosed above, in some examples, dithering the effective resistance of a gate line includes dithering a resistance associated with a tail TFT of the gate line. Additionally or alternatively to one or more of the examples disclosed above, in some examples, the processor is further caused to correct a touch image of the touch input device based on the measured change in the in the detected touch signal caused by the dithering. Additionally or alternatively to one or more of the examples disclosed above, in some examples, the first stimulation signal and the second stimulation signal are independently adjustable.

Some examples of the disclosure are directed to a method of dynamically reducing the effect of noise on a touch sensor panel, the method comprising measuring a detected touch signal, dithering a parameter of a circuit element proximal to the touch sensor panel, measuring a change in the detected touch signal caused by the dithering, comparing the change to a pre-determined threshold, adjusting a demodulation phase if the change in touch signal is above the pre-determined threshold, and correcting the measured touch signal if the change in touch signal is above the pre-determined threshold. Additionally or alternatively to one or more of the examples disclosed above, in some examples, dithering a parameter of a circuit element proximal to the touch sensor panel includes dithering an effective resistance of the circuit element. Additionally or alternatively to one or more of the examples disclosed above, in some examples, the circuit element includes a gate line of a display. Additionally or alternatively to one or more of the examples disclosed above, in some examples, dithering the effective resistance of a gate line includes dithering a resistance associated with a reservoir capacitor of the gate line. Additionally or alternatively to one or more of the examples disclosed above, in some examples, dithering the effective resistance of a gate line includes dithering a resistance associated with a tail TFT of the gate line. Additionally or alternatively to one or more of the examples disclosed above, in some examples, measuring a change in the detected touch signal caused by the dithering includes dithering the parameter over a plurality of touch images, and comparing the plurality of touch images to determine the change. Additionally or alternatively to one or more of the examples disclosed above, in some examples, measuring a change in the detected touch signal caused by the dithering includes dithering the parameter at a fixed frequency during an acquisition of a touch image, acquiring a touch image, and filtering the acquired touch image so as to isolate a portion of the acquired touch image correlated to the dithering of the parameter. Additionally or alternatively to one or more of the examples disclosed above, in some examples, the demodulation phase is adjusted such that the phase is orthogonal to a phase of the cross-talk noise.

Some examples of the disclosure are directed to a non-transitory computer readable storage medium having stored thereon a set of instructions for reducing the effects of noise in a touch sensor panel, that when executed by a processor causes the processor to measure a detected touch signal, dither a parameter of a circuit element proximal to the touch sensor panel, measure a change in the detected touch signal caused by the dithering, compare the change to a pre-determined threshold, adjust a demodulation phase if the change is above the pre-determined threshold, correct the measured touch signal if the change in the in the touch signal is above the pre-determined threshold. Additionally or alternatively to one or more of the examples disclosed above, in some examples, dithering a parameter of a circuit element proximal to the touch sensor panel includes dithering an effective resistance of the circuit element. Additionally or alternatively to one or more of the examples disclosed above, in some examples, the circuit element includes a gate line of a display. Additionally or alternatively to one or more of the examples disclosed above, in some examples, dithering the effective resistance of a gate line includes dithering a resistance associated with a reservoir capacitor of the gate line. Additionally or alternatively to one or more of the examples disclosed above, in some examples, dithering the effective resistance of a gate line includes dithering a resistance associated with a tail TFT of the gate line. Additionally or alternatively to one or more of the examples disclosed above, in some examples, measuring a change in the detected touch signal caused by the dithering includes dithering the parameter over a plurality of touch images, and comparing the plurality of touch images to determine the change in the touch signal. Additionally or alternatively to one or more of the examples disclosed above, in some examples, measuring a change in the detected touch signal caused by the dithering includes dithering the parameter at a fixed frequency during an acquisition of a touch image, acquiring a touch image, and filtering the touch image so as to isolate a portion of the acquired touch image correlated to the dithering of the parameter. Additionally or alternatively to one or more of the examples disclosed above, in some examples, the phase of the local oscillator is adjusted such that the phase is orthogonal to a phase of the cross-talk noise.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method of dynamically reducing the effect of noise on a touch sensor panel, the method comprising:
    performing a first scan of the touch sensor panel comprising:
        driving a drive electrode, sensing a corresponding sense electrode and demodulating a sense signal corresponding to the sense electrode with a demodulation signal;
        while driving the drive electrode and sensing the sense electrode, dithering a parameter of a circuit element proximal to the touch sensor panel; and
        after dithering the parameter, adjusting a phase of the demodulation signal for demodulating the sense signal; and
    after the first scan, performing a second scan of the touch sensor panel comprising:
        driving the drive electrode, sensing the corresponding sense electrode and demodulating the sense signal with the demodulation signal;
        while driving the drive electrode and sensing the sense electrode, dithering the parameter of the circuit element proximal to the touch sensor panel; and
        after dithering the parameter, maintaining the phase of the demodulation signal for demodulating the sense signal.

2. The method of claim 1, wherein dithering the parameter of the circuit element proximal to the touch sensor panel includes dithering an effective resistance of the circuit element.

3. The method of claim 2, wherein the circuit element includes a gate line of a display.

4. The method of claim 3, wherein dithering the effective resistance of the gate line includes dithering a resistance associated with a reservoir capacitor of the gate line.

5. The method of claim 3, wherein dithering the effective resistance of the gate line includes dithering a resistance associated with a tail TFT of the gate line.

6. The method of claim 1, further comprising dithering the parameter over a plurality of touch images, and comparing the plurality of touch images to determine the change.

7. The method of claim 1, further comprising:
    acquiring a touch image;
    dithering the parameter at a fixed frequency during the acquisition of the touch image;
    and
    filtering the acquired touch image so as to isolate a portion of the acquired touch image correlated to the dithering of the parameter.

8. The method of claim 1, wherein the demodulation phase is adjusted such that the phase is orthogonal to a phase of cross-talk noise.

9. A touch input device configured to reduce the effects of noise, the touch input device comprising:

a touch sensor panel;
a processor capable of:
  performing a first scan of the touch sensor panel comprising:
    driving a drive electrode, sensing a corresponding sense electrode and demodulating a sense signal corresponding to the sense electrode with a demodulation signal;
    while driving the drive electrode and sensing the sense electrode, dithering a parameter of a circuit element proximal to the touch sensor panel; and
    after dithering the parameter, adjusting a phase of the demodulation signal for demodulating the sense signal; and
  after the first scan, performing a second scan of the touch sensor panel comprising:
    driving the drive electrode, sensing the sense electrode and demodulating the sense signal with the demodulation signal;
    while driving the drive electrode and sensing the sense electrode, dithering the parameter of the circuit element proximal to the touch sensor panel; and
    after dithering the parameter, maintaining the phase of the demodulation signal for demodulating the sense signal.

10. The touch input device of claim 9, wherein dithering the parameter of the circuit element proximal to the touch sensor panel includes dithering an effective resistance of the circuit element.

11. The touch input device of claim 10, wherein the circuit element includes a gate line of a display.

12. The touch input device of claim 11, wherein dithering the effective resistance of the gate line includes dithering a resistance associated with a reservoir capacitor of the gate line.

13. The touch input device of claim 11, wherein dithering the effective resistance of the gate line includes dithering a resistance associated with a tail TFT of the gate line.

14. The touch input device of claim 9, wherein the processor is further capable of dithering the parameter over a plurality of touch images, and comparing the plurality of touch images to determine the change in the touch signal.

15. The touch input device of claim 9, wherein the processor is further capable of:
  acquiring a touch image;
  dithering the parameter at a fixed frequency during the acquisition of the touch image; and
  filtering the touch image so as to isolate a portion of the acquired touch image correlated to the dithering of the parameter.

16. The touch input device of claim 9, wherein the demodulation phase is adjusted such that the phase is orthogonal to a phase of cross-talk noise.

17. A non-transitory computer readable storage medium having stored thereon a set of instructions for reducing the effects of noise in a touch sensor panel, that when executed by a processor causes the processor to:
  perform a first scan of the touch sensor panel comprising:
    driving a drive electrode, sensing a corresponding sense electrode and demodulating a sense signal corresponding to the sense electrode with a demodulation signal;
    while driving the drive electrode and sensing the sense electrode, dithering a parameter of a circuit element proximal to the touch sensor panel; and
    after dithering the parameter, adjusting a phase of the demodulation signal for demodulating the sense signal; and
  after the first scan, perform a second scan of the touch sensor panel comprising:
    driving the drive electrode, sensing the sense electrode and demodulating the sense signal with the demodulation signal;
    while driving the drive electrode and sensing the sense electrode, dithering the parameter of the circuit element proximal to the touch sensor panel; and
    after dithering the parameter, maintaining the phase of the demodulation signal for demodulating the sense signal.

18. The non-transitory computer readable storage medium of claim 17, wherein dithering the parameter of the circuit element proximal to the touch sensor panel includes dithering an effective resistance of the circuit element.

19. The non-transitory computer readable storage medium of claim 18, wherein the circuit element includes a gate line of a display.

20. The non-transitory computer readable storage medium of claim 19, wherein dithering the effective resistance of the gate line includes dithering a resistance associated with a reservoir capacitor of the gate line.

21. The non-transitory computer readable storage medium of claim 19, wherein dithering the effective resistance of the gate line includes dithering a resistance associated with a tail TFT of the gate line.

22. The non-transitory computer readable storage medium of claim 17, wherein the instructions further cause the processor to dither the parameter over a plurality of touch images, and compare the plurality of touch images to determine the change in the touch signal.

23. The non-transitory computer readable storage medium of claim 17, wherein the instructions further cause the processor to:
  acquire a touch image
  dither the parameter at a fixed frequency during the acquisition of the touch image;
  and
  filter the touch image so as to isolate a portion of the acquired touch image correlated to the dithering of the parameter.

24. The non-transitory computer readable storage medium of claim 17, wherein the phase of the local oscillator is adjusted such that the phase is orthogonal to a phase of cross-talk noise.

25. A touch input device configured to reduce the effects of noise, the touch input device comprising:
a touch sensor panel; and
a processor capable of:
  measuring a detected touch signal on the touch sensor panel;
  while measuring the detected touch signal, dithering a parameter of a circuit element proximal to the touch sensor panel;
  measuring a change in the detected touch signal caused by the dithering, the measurement including demodulating the detected touch signal using a demodulation signal having a demodulation phase;
  comparing the change in the detected touch signal caused by the dithering to a pre-determined threshold;
  in accordance with a determination that the change in the detected touch signal caused by the dithering is above the pre-determined threshold, adjusting the demodulation phase of the demodulation signal for demodulating the detected touch signal; and in accordance with a determination that the change in the detected touch signal caused by the dithering is below the pre-determined threshold, maintaining the demodulation phase of the demodulation signal for demodulating the detected touch signal.

* * * * *